US010768885B1

(12) United States Patent
Fieldman

(10) Patent No.: US 10,768,885 B1
(45) Date of Patent: Sep. 8, 2020

(54) VIDEO CONFERENCE WITH SHARED WHITEBOARD AND RECORDING

(71) Applicant: Study Social, Inc., Gainesville, FL (US)

(72) Inventor: Ethan Fieldman, Gainesville, FL (US)

(73) Assignee: STUDY SOCIAL INC., Gainesville, FL (US)

( * ) Notice: Subject to any disclaimer, the term of this patent is extended or adjusted under 35 U.S.C. 154(b) by 41 days.

(21) Appl. No.: 16/392,383

(22) Filed: Apr. 23, 2019

(51) Int. Cl.
| | | |
|---|---|---|
| *G06F 3/14* | (2006.01) | |
| *H04L 12/18* | (2006.01) | |
| *H04L 29/08* | (2006.01) | |
| *H04N 7/15* | (2006.01) | |
| *G06T 11/20* | (2006.01) | |
| *G06F 9/451* | (2018.01) | |
| *G09B 5/10* | (2006.01) | |

(52) U.S. Cl.
CPC ............ *G06F 3/1454* (2013.01); *G06F 9/452* (2018.02); *G06T 11/203* (2013.01); *H04L 12/1822* (2013.01); *H04L 67/146* (2013.01); *H04N 7/155* (2013.01); *G09B 5/10* (2013.01)

(58) Field of Classification Search
CPC ............ G06F 11/3414; G06F 2201/86; G06F 11/3438; G06F 16/40; G06F 3/1454; G06F 9/452; H04M 3/5307; H04M 3/42221; H04M 3/567; H04N 7/155; H04N 5/765; H04N 7/15; H04L 67/22; H04L 65/403; H04L 12/1831; G06Q 10/101; G06T 11/203
See application file for complete search history.

(56) References Cited

U.S. PATENT DOCUMENTS

| | | | | |
|---|---|---|---|---|
| 7,679,637 B1 * | 3/2010 | Kohler | ................ | H04L 12/1827 348/14.01 |
| 7,908,321 B1 * | 3/2011 | Rust | ...................... | G06Q 10/10 709/204 |
| 9,032,020 B2 * | 5/2015 | Gregg | .................. | H04N 21/222 709/203 |
| 9,445,048 B1 * | 9/2016 | Nariyawala | .............. | H04N 7/15 |

(Continued)

OTHER PUBLICATIONS

L. Brown, "How to Record Skype Video Call for Free," published Jan. 10, 2018, downloaded from https://filmora.wondershare.com/screen-recorder/how-to-record-skype-video-call.html (Year: 2018).*

*Primary Examiner* — Eric J Yoon
(74) *Attorney, Agent, or Firm* — Beyer Law Group LLP

(57) ABSTRACT

One or more users log in to a video conference with a shared, online electronic whiteboard and draw upon a shared whiteboard. Each user has a video and audio stream that are sent to a recording server. Data describing each drawing action upon the shared whiteboard is sent to a database server and each action is then distributed to all users to update their whiteboards. Screenshots of the drawing actions are created by emulating a browser and inputting data describing each action from the database. Alternatively, screenshots are taken by each user computer (after each action or periodically) and sent to the recording server. Audiovisual manipulation software is used to create a whiteboard video from the screenshots are then combined with the audio and video streams to create a resulting video of the entire session. A video clip is created simply by sending begin and end timestamps during the session.

20 Claims, 30 Drawing Sheets

(56) References Cited

U.S. PATENT DOCUMENTS

| | | | |
|---|---|---|---|
| 9,699,409 B1* | 7/2017 | Reshef | H04N 7/155 |
| 2010/0095208 A1* | 4/2010 | White | G06F 16/9577 |
| | | | 715/704 |
| 2015/0039998 A1* | 2/2015 | Lieb | G06F 3/1454 |
| | | | 715/234 |
| 2018/0160076 A1* | 6/2018 | Ozaki | H04N 7/147 |

* cited by examiner

Welcome Screen

Welcome Screen

```
{
    action: "add" ~1010
    isSMS: false
    jsonBounds: " "
    jsonPath:  ~1026                  1020  1028  1030    1022              1024
["Path" , {"applyMatrix" : true, "data" : {"color" / "#ffffff" ,"pageNum" : 1, "strokeWidth":3,
"id" : "pen_41427_1555957054918603", "type" :"pen" , "kind" : "Pen", "handleable" :
true, "highlightable" : true}, "segments" : [ [691,334] , [691,292] , [698, 245] , [702, 236]
, [709, 216]], "strokeColor" : [1, 1, 1] ["strokeWidth" : 3, "strokeCap" : "round"} ] "
    lastModifiedBy:  41427                                                          \1032
    linesSegments: " "       \1040   \1036
1034 objectID:  " "
    pageNum:  1
    pageNumToRedo: " "
    pageNumToUndo: " "
    propItem: {color: " ", page: " ", size: " ", txtFormat: " "}
    propsAndValues: " "
    uniqueUsserID: 41427 ~1042
}
```

FIG. 22
Normal Stroke

```
{
    action: "move" ~1110
    isSMS: false
    jsonBounds: [" ["Rectangle",957.5, 227, 277, 358] "] ~1120
    jsonPath:  " "
    lastModifiedBy: 51449 ~1122
    objectID: ["raster_51449_1555957759180517"] ~1124
    pageNum: 1
    pageNumToRedo: " "
    pageNumToUndo: " "
    propItem: {color: " ", page: " ", size: " ", txtFormat: " "}
    propsAndValues: " "
    uniqueUsserID: 51449
}
```

FIG. 23
Move Image

```
{
    action: "delete" ~1210
    isSMS: false
    jsonBounds: " "
    jsonPath: " "
    lastModifiedBy: 51449 ~1220
    linesSegments: " "
    objectID: ["pen_41427_1555957054918603"] ~1222
    pageNum: 1
    pageNumToRedo: " "
    pageNumToUndo: " "
    propItem: {color: " ", page: " ", size: " ", txtFormat: " "}
    propsAndValues: " "
    uniqueUsserID: 51449
}
```

FIG. 24
Delete Stroke

```
edward
  ├─created: 1551984602680
  ├─date: "3/7/2019"
  ├─draw
  │   ├─bgColor
  │   ├─grid
  │   │   ├─gridClass: "large-grid"
  │   │   └─userid: 64
  │   ├─ImageOrder
  │   │   ├─list
  │   │   └─userid: 64
  │   ├─json: "[ [ \ "Layer \", {|"name\" :\ "clipboardLayer\",\"applyMatrix..."     ⎫ 1330
  │   └─subjectBox: "chemistry"                                                      ⎬ 1320
  ├─pages
  ├─sessionid: "2_MX4BNDk3MjIwMn5-MTU1NTk2NTg0Q%g0Mn5PeGYydVFMZ..."
  ├─subdomain: " "
  ├─[time:] "12:50 PM"  X
  └─users
       └─ 64
```

↗
1310

Entire Session Object

FIG. 25

VIDEO CONFERENCE WITH SHARED WHITEBOARD AND RECORDING

CROSS-REFERENCE TO RELATED APPLICATIONS

This application is related to U.S. patent application Ser. No. 16/198,414, entitled "BANDWIDTH REDUCTION IN VIDEO CONFERENCE GROUP SESSIONS," filed Nov. 21, 2018, now U.S. Pat. No. 10,404,943, issued Sep. 3, 2019, which is hereby incorporated by reference.

FIELD OF THE INVENTION

The present invention relates generally to video conferencing. More specifically, the present invention relates to recording a video conference having a shared whiteboard.

BACKGROUND OF THE INVENTION

With computers and similar devices now becoming nearly ubiquitous, it is now more common for individuals to communicate with one another, hold meetings, study together, etc., using video conferencing or video chat capabilities of their computers. A video conference can be more convenient for the participants, less expensive and easier to arrange, especially when the participants are located remotely from one another. Common online video conference services include Skype, Google Hangouts, Facebook Messenger, Zoom, WebEx, etc.

During such a video conference it is common to share a document such that an electronic document that one participant has on his or her computer can be shared and thus viewed by other participants on the video conference. A participant may also desire to draw on his or her computer screen or document and have that drawing be viewed in real-time by the other participants, but, no suitable technology exists for such a shared electronic whiteboard that minimizes bandwidth of the participant computers. Further, it can be desirable to create a video of the drawings made upon a shared electronic whiteboard without having to consume the resources or bandwidth of a participant's computer in recording that video, storing it or transmitting it. Even further, it is desirable to create a video of an entire shared whiteboard session, including not only a video of the whiteboard itself, but also of the video and audio streams from the various participants. Additionally, it is also desirable for a simple technique to create video clips of a shared whiteboard session, again, without overly burdening a participant's computer. Unfortunately, the state-of-the-art has not progressed to the point where the above techniques are available.

Accordingly, improved techniques and systems are desired to provide videoconferencing with a shared, electronic whiteboard and that also provide for creating a video of the whiteboard, the entire session, or video clips of that session.

SUMMARY OF THE INVENTION

To achieve the foregoing, and in accordance with the purpose of the present invention, techniques are disclosed that improve the use of shared whiteboards in a video conference.

One or more users log in to a video conference with a shared, online electronic whiteboard and begin a session by speaking and manipulating the shared whiteboard. For each user there is a video stream showing a video of the user interacting and an audio stream that records their voice. These streams are sent to a recording server and recorded in real time. In addition, the changes made to the shared whiteboard by each user are sent to a database server. At some point in time, these streams and changes are combined in order to produce a video of the whiteboard session.

In a first embodiment of the invention, one or more users log in to a video conference session with a shared whiteboard and interact by speaking and manipulating the shared whiteboard. After each action by the user that changes the whiteboard (i.e., draw line, drawn arc, upload a photograph, change an object, etc.), data reflecting that change is sent to a database server along with a timestamp and is saved in an action log. Each change is then immediately distributed to the other users in that session so that each can see changes made to the shared whiteboard in real time by the other users.

In a second embodiment of the invention, in order to create a video of the shared whiteboard as it changes, a browser is emulated in a server and draws the actions that occur over time using the action log and takes a screenshot of that whiteboard as it changes. The screenshots are then used to create a video of the shared whiteboard over time.

In a third embodiment of the invention, in order to create a video of the shared whiteboard as it changes, a browser of a user computer takes a screenshot after each drawing action and saves these screenshots to database. The screenshots are then used to create a video of the shared whiteboard over time.

In a fourth embodiment of the invention, in order to create a video of the shared whiteboard as it changes, a browser of a user computer periodically takes a screenshot of the electronic whiteboard and saves these screenshots to database. The screenshots are then used to create a video of the shared whiteboard over time.

In a fifth embodiment, the video of the shared whiteboard is combined with the synchronized video and audio streams from all users in order to create a single video of the session as it occurred in real time.

In a sixth embodiment, a user may create a video clip of a portion of a session using the shared whiteboard. When the session begins the shared whiteboard and the session are recorded as described above (or by using any other suitable technology) automatically without any user intervention. When the user desires to create a video clip of a certain portion of the session he or she presses a "start video" button which simply sends a timestamp to the recording server. When the user desires to end the video clip he presses an "end video" button which, again, simply sends a second timestamp to the recording server. The recording server then uses the first and second timestamps to clip a portion of the recorded session and saves this clip for future access by the user.

Advantageously, in variations of these embodiments, no data need be recorded on any of the user computers or mobile telephones, thus allowing users having devices with limited processing power or limited storage to interact with a shared whiteboard and to record it without actually having to store any data on their device. Later, any user can request a video of the session that had occurred.

BRIEF DESCRIPTION OF THE DRAWINGS

The invention, together with further advantages thereof, may best be understood by reference to the following description taken in conjunction with the accompanying drawings in which:

FIG. 22 is a portion of a JSON file representing a normal stroke made on a shared whiteboard.

FIG. 23 is a portion of a JSON file representing moving an image on a shared whiteboard.

FIG. 24 is a portion of a JSON file representing deleting a stroke on a shared whiteboard.

FIG. 25 is JSON code representing an entire session object that is stored within the shared database.

DETAILED DESCRIPTION OF THE INVENTION

As mentioned above, embodiments of the present invention allow multiple participants to manipulate, view, and record an online, shared, electronic whiteboard in real time, using any of the systems and computers shown in FIGS. 1-3, 26, 27 and described below.

Online Social Education System Overview

Figure 1:
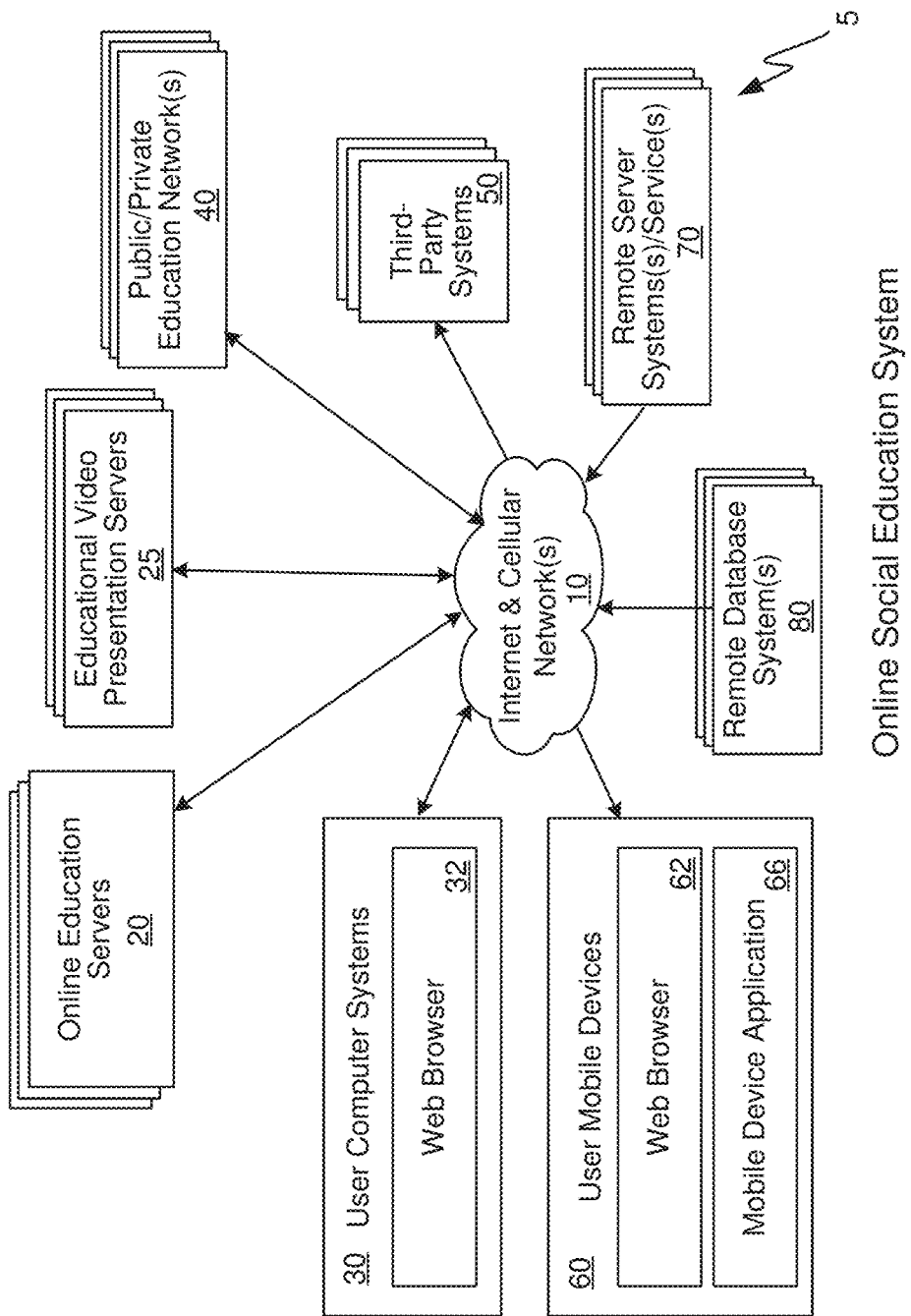
FIG. 1 is a block diagram of an Online Social Education System (OSES), which may be implemented via a computerized data network.

FIG. 1 is a block diagram of an Online Social Education System (OSES) 5, which may be implemented via a computerized data network. More specifically, the techniques described herein utilize technology to construct and implement an online learning system for students, tutors, instructors, teachers and parents. These techniques foster a dynamic, online education environment via social interaction which is non-linear, hands-on, effective and fun.

The Online Social Education System 5 includes any number of education server computers 20 that help to implement the inventive embodiments described below. Public or private education networks 40 include, for example, student information systems (SIS), student data management networks, etc. Third-party systems 50 include computers and software for social networks (e.g., Facebook, Twitter, Google, etc.) and online video conferencing and Web seminars (e.g., WebEx, Adobe Connect, Skype, etc.). Remote server systems and services 70 include content provider servers and services such as media streaming, database storage and access, financial transactions, payment gateways, electronic commerce, event management, etc. Remote database systems 80 provide access to any remote database.

User computers 30 include any number of computers used by participants, students, teachers, tutors, etc., and include personal computers (PCs), desktop computers, laptop computers, tablet computers, set-top boxes (STB), personal digital assistants (PDAs), etc., and typically each will include a Web browser 32 to access the World Wide Web via a network. User mobile devices 60 are any number of mobile telephones, smartphones, tablet computers, or similar devices used to communicate voice and data over a cellular network, and may also include a Web browser 62 and any number of software applications 66 (or "apps") used to perform functions on the device and over the network. Internet and cellular networks 10 include the Internet and cellular networks over which the above devices and systems communicate.

Figure 2:
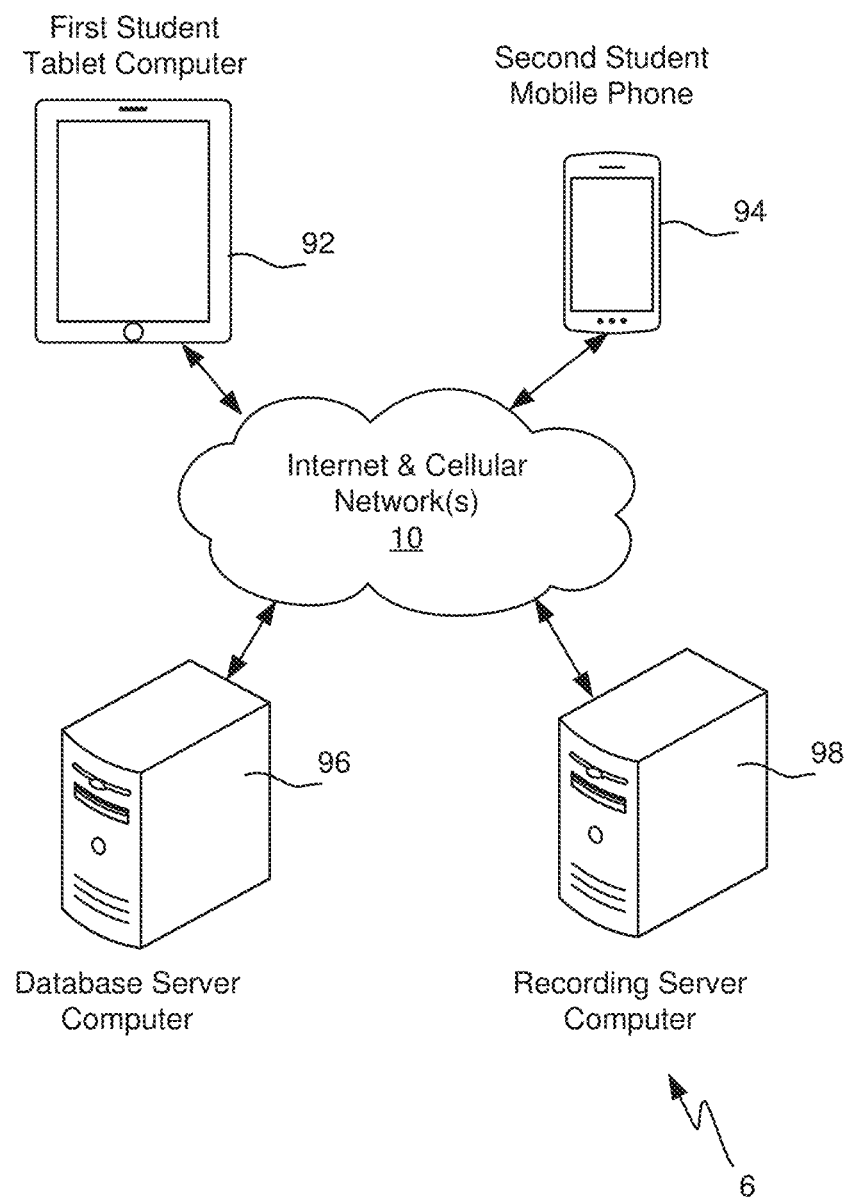
FIG. 2 illustrates a video conference recording system 6 (which is a specific embodiment of the online social education system 5 of FIG. 1) used to implement the present invention.

FIG. 2 illustrates a video conference recording system 6 (which is a specific embodiment of the online social education system 5 of FIG. 1) used to implement the present invention. Shown are various user devices such as tablet computer 92 and mobile telephone 94. Advantageously, the present invention in one embodiment is able to record a video conference and shared whiteboard session between users of devices 92 and 94 without storing any information on those devices, thus reducing usage of processing power and storage on those devices. One or more of these devices communicate over a network 10 not only to communicate between themselves (as will be described in more detail below), but also to record their audio and video streams and interactions with a shared, online, electronic whiteboard.

Database server computer 96 is one of computers 20 that includes a shared, real-time database. Computer 96 may be operated by the operator of computer 20, may be a computer operated by a cloud service, etc. The shared, real-time database executing within computer 96 stores an action log of all actions that are created or occur on the shared whiteboard in real time. In other words, each action by one of the users to modify the shared whiteboard (e.g., a drawing or a line) is sent over network 10 and stored within this shared database and typically includes metadata such as a timestamp and user identifier, as well as the data describing the action. In one particular embodiment, in order to reduce bandwidth, storage, time and costs, an actual image, snapshot, screenshot or video of the shared whiteboard is not sent from the user computing device to database computer 96 nor stored upon it; only the data that describes the drawing action is sent. In other embodiments having different advantages, screenshots are sent from the user computing devices to computer 98. The shared, real-time database may be implemented in many ways; typically it is a large JSON array of actions that are updated in real time and shared between the various user devices 92, 94, etc. In one specific embodiment, this database is the Firebase product available from Google, Inc., but may be other products such as MongoDB, Redis, or Google Real-Time Engine (which powers Google Documents and similar applications).

Online Education Server Computer

Figure 3:
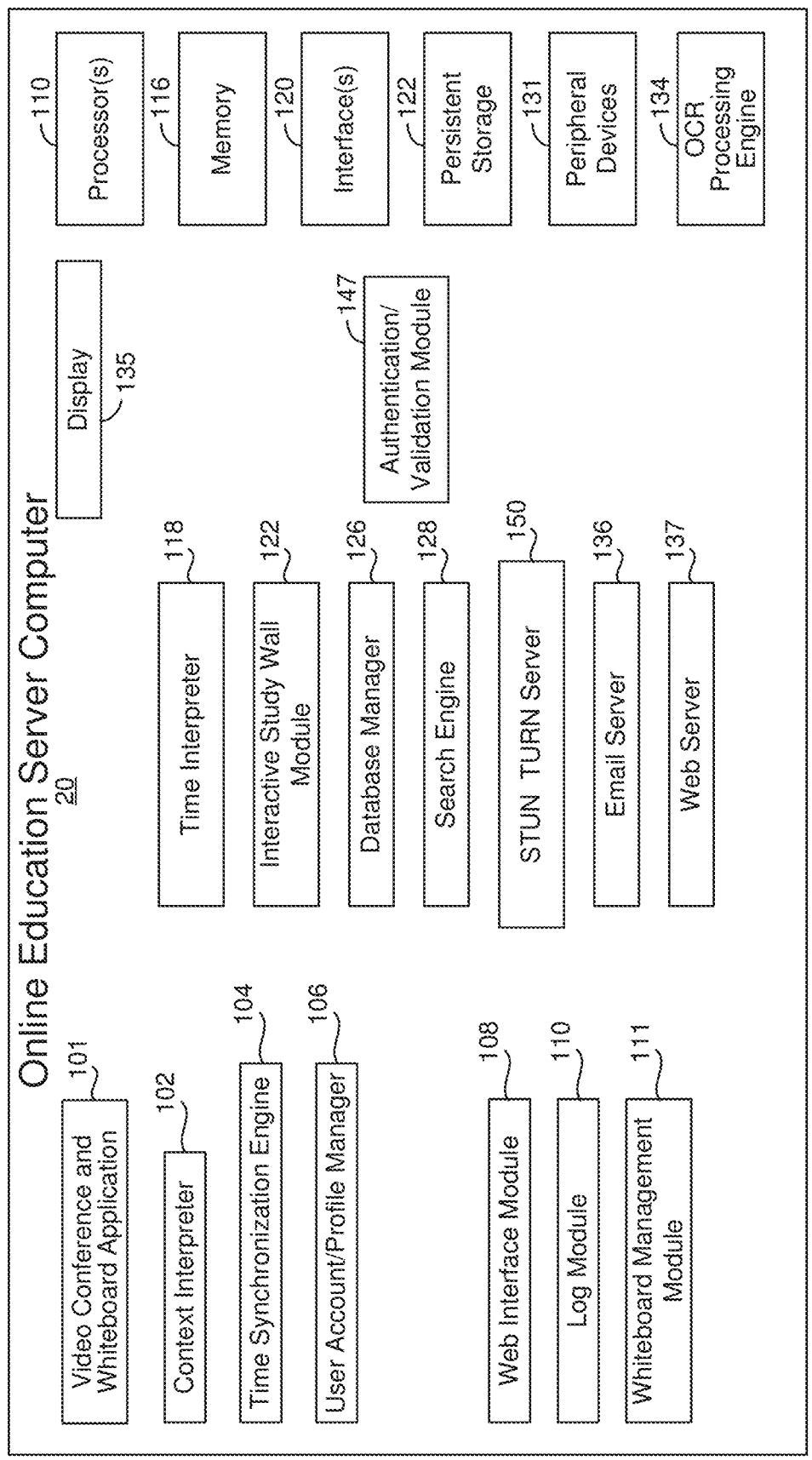
FIG. 3 is a block diagram of an online education server computer that includes a number of software modules, servers and hardware as described below.

FIG. 3 is a block diagram of an online education server computer 20 that includes a number of software modules, servers and hardware as described below.

Included is a STUN or TURN server 150 (or both) for facilitating communication between user computers 30 and user mobile devices 60. Server 150 is used to signal to participant computers as to who is in a video conference, their IP addresses, etc. Session Traversal Utilities for NAT (STUN) is a set of methods and a protocol for traversal of NA gateways in real-time voice, video, messaging and other applications. STUN allows hosts to communicate and is used by other protocols such as Interactive Connectivity Establishment (ICE), the Session Initiation Protocol (SIP), or WebRTC. The protocol uses a third-party network server (STUN server) located on the public side of the NAT, usually the public Internet.

Traversal Using Relays around NAT (TURN) is a protocol that also assists in traversal NATs or firewalls for voice, video and messaging applications. Traversal Using Relay NAT (TURN) is a protocol that allows a client to obtain IP addresses and ports from relay that relays data through a server that resides on the public Internet. Although TURN almost always provides connectivity to a client, it is resource intensive for the provider of the TURN server. It is desirable to other mechanisms (such as STUN or direct connectivity) before using a TURN server. Interactive Connectivity Establishment (ICE) methodology may be used to find the optimal connectivity means.

Typically, two WebRTC clients communicate with each other using ICE. ICE allows WebRTC to find the best path to connect peer computers. It may be able to do that with a direct connection between the clients, but also works for clients where a direct connection is not possible (i.e., behind NATs). In the case of asymmetric NAT, ICE uses STUN server 150. In most cases, a STUN server is only used during the connection setup and once that session has been established, media will flow directly between clients. If a STUN server cannot establish the connection, ICE uses TURN. A TURN server is often used in the case of a symmetric NAT. Unlike STUN, a TURN server remains in the media path after the connection has been established. Thus, it is not typically used unless data is ever to be stored or recorded.

Server computer 20 includes a video conference and whiteboard application 101 that implements the GoBoard video conference service which is combined with an online, shared, electronic whiteboard. U.S. Pat. No. 10,126,927 referenced above, "Collaborative, Social, Online Education and Whiteboard Techniques," describes this video conference and electronic whiteboard application in greater detail, and is hereby incorporated by reference.

Server computer 20 also includes a context interpreter 102 which analyzes contextual criteria relating to a detected event or condition and automatically determines a contextually-appropriate response. Examples of contextual criteria include: location-based criteria of a client or agent device; time-based criteria; identity of user; user profile information; transaction history information; recent user activities; and location-based business-related criteria. A time synchronization engine 104 manages universal time synchronization via NTP or GPS. Time interpreter 118 may modify or change identifier activation and expiration times based on various criteria such as time, location, transaction status, etc. User account or user profile manager 106 stores user information in a suitable database of server computer 20. Web Interface module 108 manages communications and transactions with a Web portal of the OES computer 20. Log module 110 generates and manages transactions, history logs, system errors, connections from APIs, etc. Whiteboard management module 111 implements various types of electronic whiteboard functions used by module 122. Interactive study wall module 122 implements functions related to an online, shared, electronic study wall used by students, tutors and teachers.

Database manager 126 handles various tasks relating to database updating, database management, database access, etc. A search engine 128 searches for transactions, logs, items, accounts, etc., in the various databases. Electronic mail server 136 provides various functions relating to e-mail activities and communications. Web server 137 provides various functions relating to Web server activities and communications.

Authentication/validation module 147 performs various types of authentication/validation tasks such as authenticating devices and users, verifying passwords, SSL certificates, biometric identification information, or other security-related information, verifying activation or expiration times, etc. Module 147 may authenticate the identity of the current user or client computer. For example, the current user may be required to perform a login process at their computer or mobile device in order to access functionality of the OES computer 20. OCR processing engine 134 performs optical character recognition of images such as those captured by a mobile device camera or camera of a computer.

Server computer 20 itself includes at least one processor 110, memory 116 (such as volatile memory or RAM), interfaces 118 which include wired interfaces or wireless interfaces, persistent storage 122 (such as hard disks, non-volatile memory, unalterable memory, flash drives, optical storage, etc.), peripheral devices 131 and one or more displays 135.

Begin Session Flow Diagram

Figure 4:
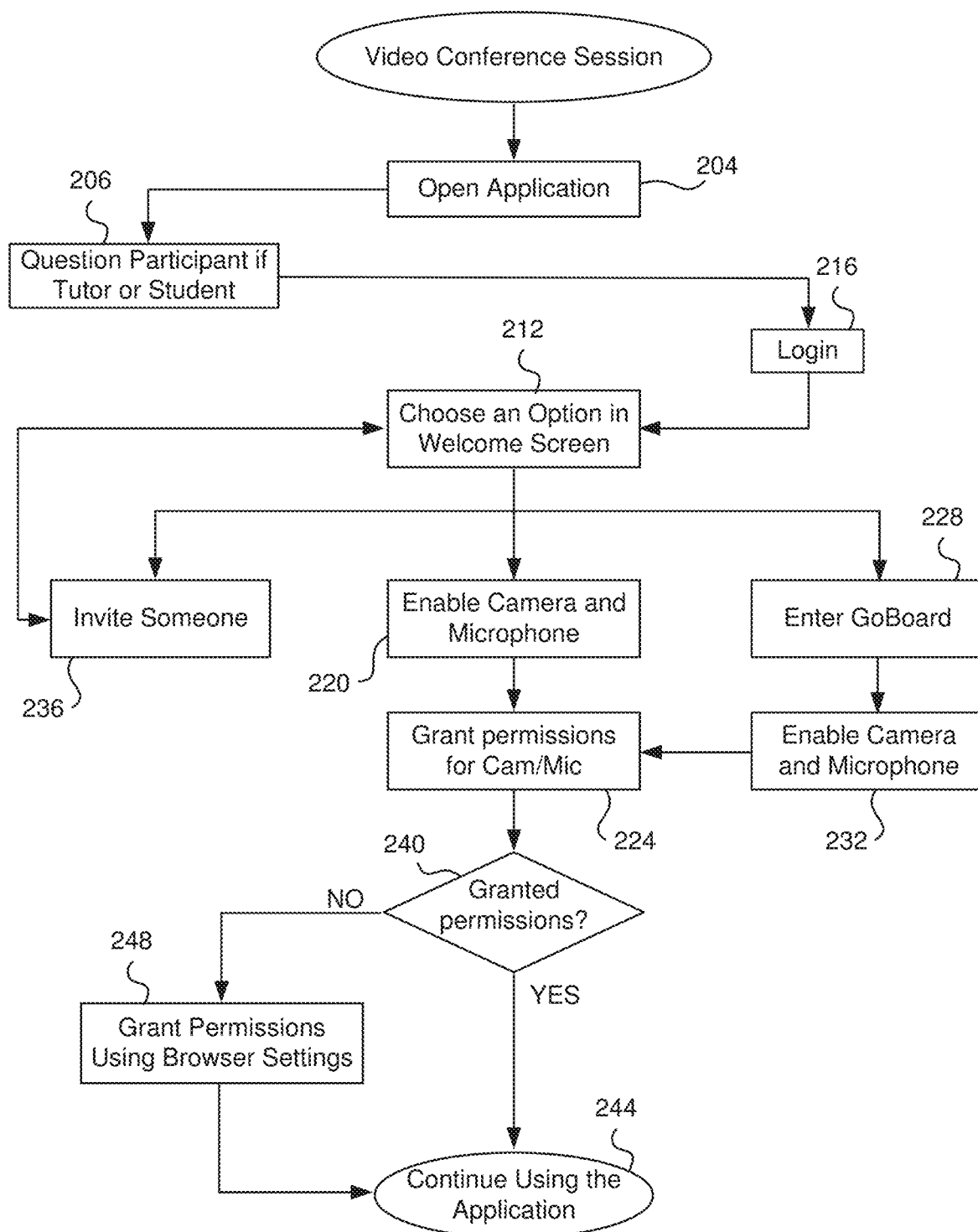
FIG. 4 is a flow diagram describing one embodiment by which a session is held between multiple participants taking part in a video conference.

FIG. 4 is a flow diagram describing one embodiment in which a video conference session is begun between multiple participants. The participants may be using any suitable video conferencing software or service in order to hold the session. The present invention may be used with suitable video conferencing services such as Skype, Adobe Connect, Google Hangouts, Facebook Messenger, Zoom, WebEx, etc. Steps of FIG. 4 may be implemented using the video conferencing and whiteboard application 101 as well as software on the participant's computing device (as applicable).

In one particular embodiment, the present invention is used in conjunction with the GoBoard online service (available from Study Edge, Inc.) which combines video conferencing with an online, shared, electronic whiteboard. Access to GoBoard is via the link "www.goboard.com" and requires no explicit downloading of software manually by a user to a desktop computer, although the application 101 does download JavaScript code to the participant's browser for use in implementing various of the steps described below. The GoBoard video conference and shared whiteboard service runs on two different platforms: a desktop version available via the Internet from a computer browser and an application on a tablet computer or mobile device, both of which access the video conference and whiteboard application 101. The U.S. patent referenced above, "Collaborative, Social, Online Education and Whiteboard Techniques," describes this video conference and shared whiteboard in greater detail, and is hereby incorporated by reference. GoBoard works best with an iPad tablet computer and an Apple digital pen. If using a desktop computer with a Web camera and microphone, the Wacom/Bamboo tablet computer works well. A Google Chrome browser is best (if on a desktop computer) along with at least 5 Mbps internet download speed. The following figures show the present invention being used with the GoBoard online service, although use of the invention with GoBoard in particular is not required.

In a first step 204 a participant (e.g., a tutor, a student, or other user) opens the video conferencing application using his or her computer, tablet or mobile device. Using GoBoard as an example, a participant using a desktop computer goes to the Web site "goboard.com" or if using a tablet or mobile device clicks on the GoBoard application (previously downloaded to their tablet computer or mobile telephone). Either approach opens a link from the participant computer or device to application 101 on server computer 20. If using a desktop computer with a Web browser, application 101 downloads JavaScript code to implement (within the user's browser) the functionality of operating a shared canvas with a WebRTC connection for audio and video conferencing. Within this canvas, users can share text, shapes, images, and other media objects in real time.

If using an application on a tablet computer or mobile device, this functionality is already included within that application. If using another video conference service, the participant opens that service as appropriate which may then implement embodiments of the present invention herein described. In one embodiment, each participant computing device implements WebRTC which is a real-time peer-to-peer communication platform for sharing video streams and audio streams between participant computers. Other similar peer-to-peer communication platforms may also be used such as Skype and Facetime. If a participant is using an application on a tablet computer or mobile device he or she may still use WebRTC. In other words, WebRTC is not always browser based; it can be operated from within a mobile telephone and from within any type of application—browser, mobile application, desktop application or otherwise. In order to emulate the drawings in the backend, however, it is preferable to emulate a browser.

Figure 5:
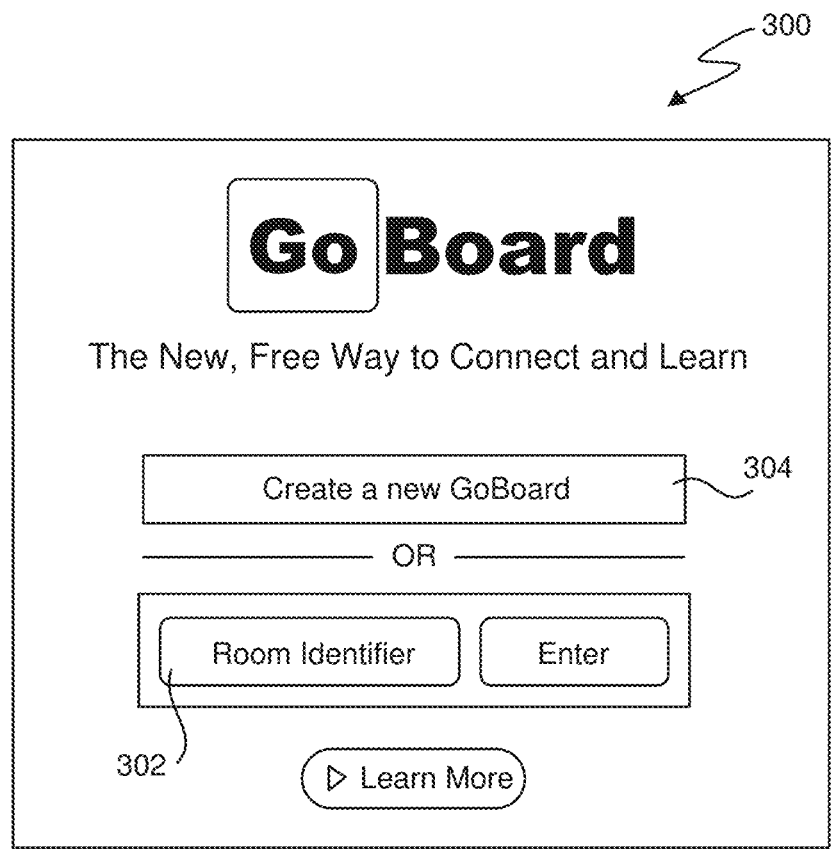
FIG. 5 shows the video conference landing page that appears once the participant has entered the application.

FIG. 5 illustrates the GoBoard landing page 300 that appears once the participant has opened the application in step 204. A participant may enter an existing GoBoard room identifier at 302 in order to view an existing session (i.e., a session that has already been started by another participant) or may click upon button 304 in order to start a new session in which the participant will be the first one to join.

An educational institution may also choose to create room identifiers ahead of time for each student, e.g., "university-.goboard.com/abc123," where "abc123" is a student identification number to allow each student told a conference with a tutor (and others) and to save work within a single session. Or, an institution may create room identifiers for particular courses and allow students and tutors to join those sessions identified by those identifiers.

In any case, in a next step 206 the participant is presented with an optional question as to whether the participant is a student or a tutor (or other instructor, teacher, etc.). This question may be presented in any form such as by using a similar interface as shown in FIG. 5. In order to reduce the bandwidth of a video conference, application 101 may limit the video streams that are uploaded or downloaded depending upon whether a participant is a student or a tutor in a particular session. A person who will lead the session may also be considered a tutor, and may be any person who leads, directs or instructs during the group session.

Application 101 may keep track of whether a participant is a student or tutor in a user account (or user profile) database managed by profile manager 106. The user account database may keep track of information such as the user name, e-mail address of the user, school, a user PIN, birth date, telephone number, biographic information, geolocation information, IP address of current computing device being used, user security questions, etc. If a particular user is a tutor, the database may also keep track of information such as availability, any certifications, expertise in particular subjects, a rating, course codes for courses taught, etc.

In another embodiment, step 206 may not be necessary if application 101 can cross-reference the participant's name in the user account database using information from the login step 216. If identifying information from this login step can be used to identify a particular user account, and that account does indicate whether or not the user is a student or tutor, then step 206 may not be necessary. Other ways to identify whether a participant is a student or tutor include using single sign-on from a trusted source (like a school's learning management system) or a trusted source (other vendor, school, integrated partner) authenticating themselves and passing a student/tutor role in the API response initiating the session.

In another embodiment, the login step 216 is also performed after step 206 so that all participants do login so that their role can be determined. Or, the login step may occur in place of step 206, in which case all participants do log in and their role of student or tutor is determined via the login step. The role of each participant will be associated with the computing device used, such as by using a device identifier. The login page presented to the participant in step 216 may require participant data such as first and last name and e-mail address, and such a page may be presented using an interface similar to that shown in FIG. 5. A participant may also login by providing their Facebook credentials or their Google credentials. Login step 216 is also optional; in an alternative embodiment, in step 212 a participant is presented with the welcome screen of FIG. 6 after choosing an option in FIG. 5.

Figure 6:
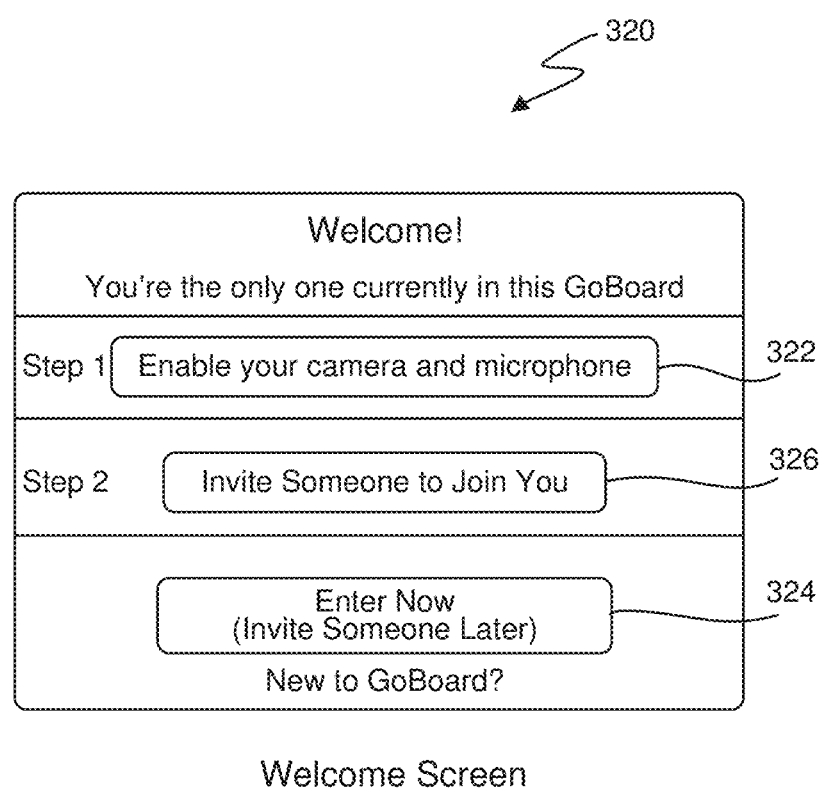
FIG. 6 shows a welcome screen on the participant's computing device that provides three options.

FIG. 6 shows a welcome screen 320 on the participant's computing device that provides three options. This is the welcome screen for the current session previously identified at 302 or 304 in FIG. 5. A participant may click on 322 in order to enable the camera and microphone on his or her computer, may click on 324 in order to enter a session (indicated from the room identifier entered at 302 or a new session previously indicated at 304), or may click on 326 in order to invite another participant to join this session. Assuming the participant clicks on 322 in step 220 his or her computer provides the option to enable the camera and microphone. The camera enabled by the user on his or her computer may not necessarily be a front-facing camera that is typically filming the user in front of the computer, but may also be a rear-facing camera (such as found on a mobile telephone), or other camera connected to the device that the user enables. It is the video from this enabled camera that will be sent as a video stream to the recording server computer 98.

Figure 7:
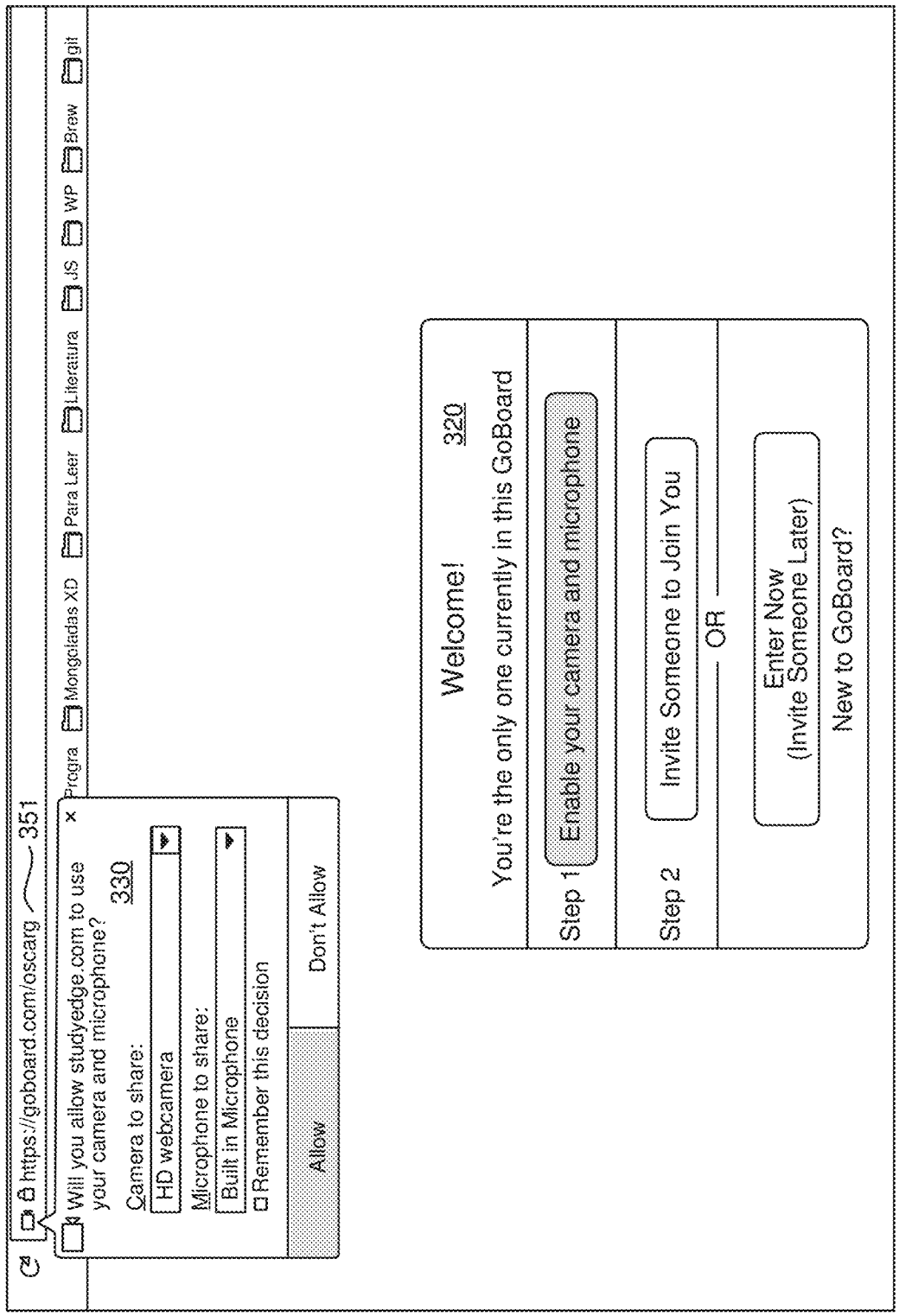
FIG. 7 shows a welcome screen on the participant computer when the participant has chosen to enable his or her camera and microphone.

FIG. 7 shows a welcome screen of the participant computer when the participant has chosen to enable his or her camera and microphone. A prompt window 330 appears giving the participant in step 224 the choice to enable his or her camera and microphone to be used by application 101. Once the permissions are granted in step 240 then in step 244 the participant is presented with a further welcome screen.

Figure 8:
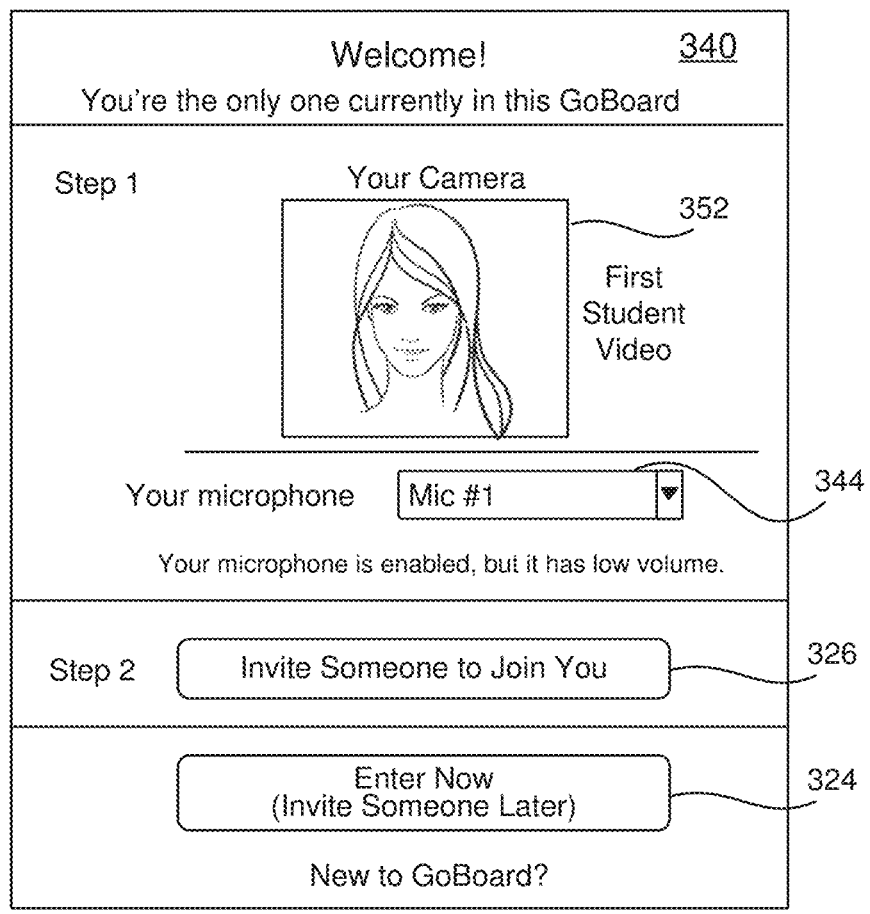
FIG. 8 shows a welcome screen presented to the participant after he or she has enabled the camera and microphone.

FIG. 8 illustrates a further version of the welcome screen 340 presented to the participant after he or she has enabled his camera and microphone. Window 342 displays a live video image of the participant taken using the camera on his or her computer; microphone 344 indicates which particular microphone is enabled on the participant computer; and, buttons 324 and 326 appear as before. The participant may now enter the current session 324 or invite another participant 326.

Figure 9:
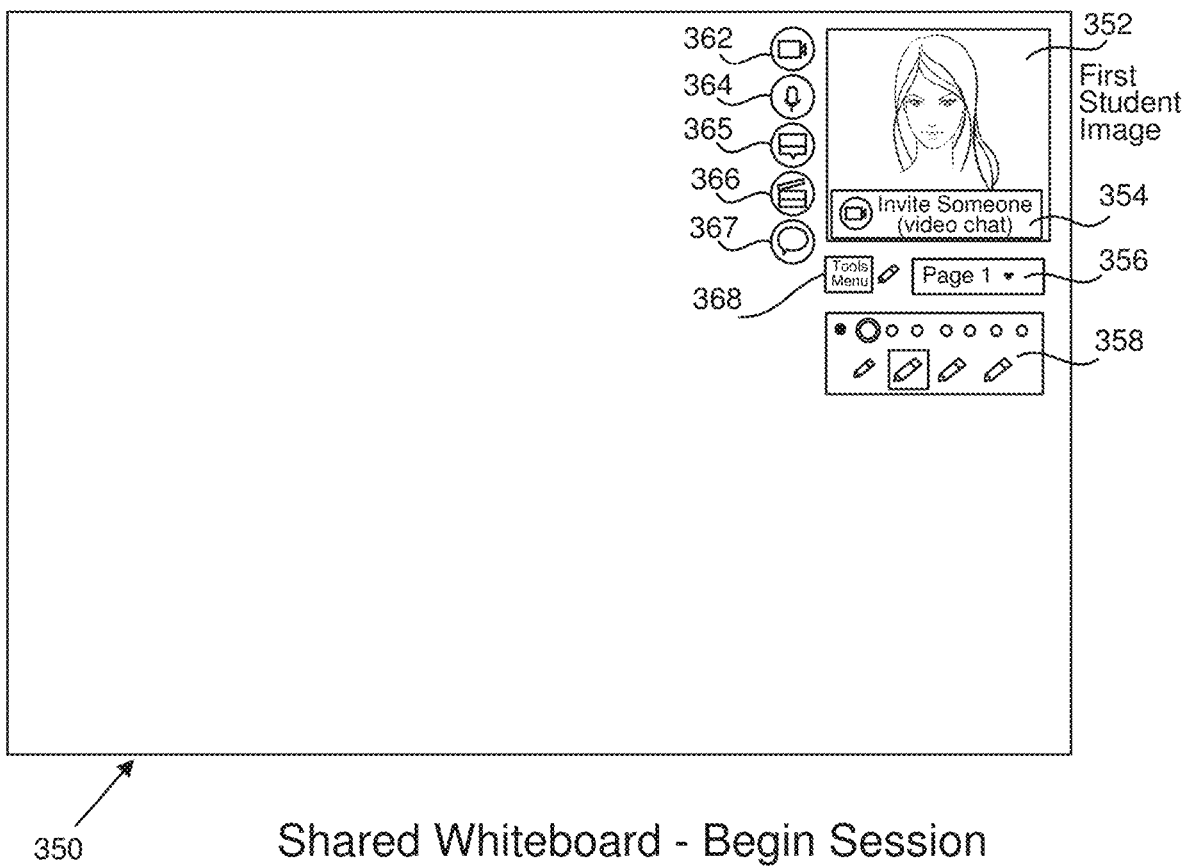
FIG. 9 shows a view of a video conference session with an online, shared, electronic whiteboard displayed in the browser of the student computer.

If the permissions are not granted explicitly by the user in step 240, then in step 248 the permissions may be granted using browser settings. For example, there are buttons (once the user is logged in) that toggle the use of microphone or camera on the left-hand side of the video box. These can be toggled by the user at any time during the session and are shown in FIG. 9. Once a participant has enabled his camera and microphone this state information will be stored on the participant computer, be sent to the computers of all other participants, and may also be sent to application 101 on server computer 20. This state information is stored by the browser (Google Chrome or Firefox, for example) in local storage, typically a local cache on the user's computer that the browser can read. Information such as the status of each user's camera and microphone, as well as their role, is stored here. Additional information like name, e-mail address, IP address, and network connection information may also be stored in this location.

Returning now to step 228, from the welcome screen 320 or 340 the participant may choose option 324 in order to immediately enter the session identified earlier in FIG. 5. Once this option is chosen, application 101 creates the online, shared electronic whiteboard, provides it with a URL (such as "https://goboard.com/abc123") and displays it on the participant screen as will be explained below in FIG. 9. Video conferencing capability using a suitable peer-to-peer communication platform will also be enabled on the participant computer.

In conjunction with step 212 (or at any time after once a participant's role has been determined, but before the participant joins a session) information concerning this student and his or her computer is sent from the computer to the STUN server 150 in server computer 20. This information, termed "participant metadata," includes the role of the participant (i.e., student or tutor), and stream information such as network parameters, etc., that will allow other computers to establish video and audio streams with the student's computer. The STUN server receives comprehensive network information for each connection between the peer devices including network address, port, network routing information and timestamp of last successful connection. It stores this data in a local database or file-based cache storage. Some may also be stored in memory (RAM).

A typical server 150 stores such participant metadata in a memory cache for later distribution to other participants. In the present invention, the role of server 150 is general participant tracking and identification of participants. Server 150 does not send or receive video or audio streams to or from participants; it simply informs all participants which other participants are in the current session. Thus, server 150 uses very little bandwidth.

FIG. 9 illustrates a view 350 of a session of the video conference with an online, shared, electronic whiteboard displayed in the browser of the participant computer when a participant begins a new session in step 244. The Web site and unique room identifier (not shown) do appear in the address bar of the browser. Shown is a video image 352 of the current and only participant, taken via the camera of his or her computer, an option 354 to invite another participant to the session, the ability 356 to move to different pages within the session, and a variety of control buttons 358 to draw on or otherwise manipulate the whiteboard within the session using the pencil tool. Video image 352 of the first student may also be a still image of the first student. Button 362 allows the participant to enable or disable his or her device camera, button 364 enables or disables the microphone, button 365 enables or disables screen sharing, button 366 starts or stops recording of a video clip within a session, button 367 opens a text chat window, and button 368 displays more available tools. The participant may enable his or her camera and microphone by clicking upon buttons 362 or 364 at any time.

As shown in FIG. 9, the shared whiteboard (at this point, blank) is rendered on the device screen of each participant who has entered the session. Any such user can draw, add text, upload a photograph, or otherwise manipulate the whiteboard and such actions will not only be stored automatically onto computer 96 but will also be sent to all other users and rendered on their screens. Such rendering of a shared whiteboard may be implemented using HTML5, Flash, or other software services such as JavaScript and native mobile applications.

The shared database will know which user computers are subscribed to which session and room identifier because the users' browser or device will send that information to the shared database upon opening the page. Preferably, the users subscribe to the shared database as soon as the user opens the room and enters the session.

Although the invention is preferably used with more than one participant, it is certainly possible for embodiments of the invention to be used in when only one participant enters a session. This participant will be able to draw on the whiteboard, the changes will be sent to the shared database, a video will be created of the drawing actions on the whiteboard, a resulting video of the whiteboard, audio and video will be created, and the participant may create video clips during his or her session.

Flow Diagram—Invite Second Participant

Figure 10:
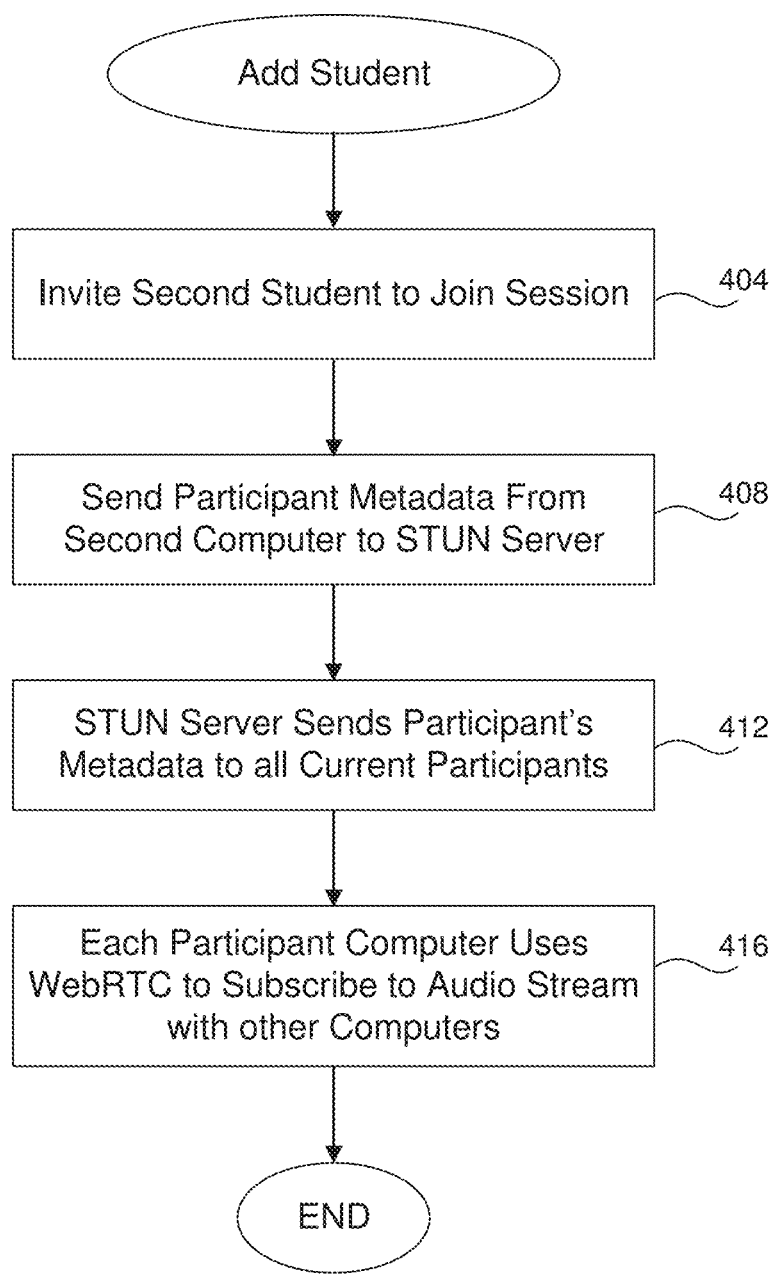
FIG. 10 is a flow diagram describing one embodiment by which a second student is invited to join the session in which the first student has joined.

FIG. 10 is a flow diagram describing one embodiment by which a second participant, in this case another student, is invited to join the current session in which only the first participant has joined. A participant may be invited to join the session by a current participant using button 354 (once a session has been entered), or by choosing button 326 before a session is entered.

Accordingly, returning now to step 236, the current participant may click upon button 326 (or 354) in order to invite another participant to the current session. Once clicked, the participant is again shown welcome screen 320 and may click upon button 326. A window opens and the participant is shown a link to the current session (e.g., "https://goboard.com/c13525"), the ability to copy the link, the ability to automatically send an e-mail message to that person with the link, or the ability to log into Facebook in order to send that link via a Facebook message. Once the second participant receives the link they may enter that link within their browser, thus taking them directly to the current session, or may open the GoBoard application as described above beginning at step 204, thus being presented with FIG. 5 and the ability to enter the room identifier in order to enter the session.

In a first step 404 the second student is invited to join the session, for example, as has been described above such as by sending a link to the second student for the GoBoard application, by sending a link including the specific room identifier, sending an e-mail message or similar, etc. In fact, sending an explicit invitation is not necessary for any participant to join a particular session. Once in possession of the room identifier, the participants may have a standing agreement to join the session at a particular time on certain dates. When the second participant joins, he or she typically will follow the flow of FIG. 4, starting at step 204, and will choose option 302 in FIG. 5.

Once the second student has joined the session (or in conjunction with), in step 408 the participant metadata for the second student will be sent from the second student's computing device to the STUN server 150 as has been described above. This metadata may be sent at any time after the student's role has been determined. The application 101 may ask the participant if he is a student or tutor. The student computer captures this information in its browser, and it can also be sent to application 101. The role is stored on each student device and is relayed to all other devices via peer-to-peer communications. The role may be stored on application 101, and then relayed to all new participants. But it is preferable to store on each student device and then distribute peer-to-peer. As mentioned above, the participant metadata for the second student includes network parameters needed to establish video or audio streams with this computer, and optionally the role of this participant, in this case, "student."

In a next step 412 the STUN server sends to all current participants in the current session all participant metadata for all of the current participants. In this example, the STUN server 150 has participant metadata for the two students currently in the session and will send this metadata to both student computers browsers. Although it is possible for the STUN server to only send the participant metadata regarding all other participants to a particular computer, in some cases it is more simple and efficient to send all participant metadata to all participants. Typically, a connection request from a new participant creates a push event to all currently connected participants, thus triggering the STUN server to send this participant metadata.

In a next step 416 the browser of each participant computer will use the received participant metadata to open video and audio streams (as applicable) with the computers of the other participants in this session. Each participant computer may determine whether or not the other participants are students or a tutor based upon the received participant metadata that lists the role of each participant.

In this example, as both participants are students, each participant computer will use their own WebRTC library in order to subscribe to audio and video streams from the other computer; the audio and video is streamed directly between participant computers and need not pass through a central computer. Each computer may use a push or pull process to perform this subscription. These computers perform the subscription using a peer-to-peer communications platform and do not need to rely upon any central server for controlling this subscription and do not need to stream any audio/visual information through any central server. By streaming directly between the two student computers, bandwidth can be kept low. Each participant computer uses the network parameters from the participant metadata in order to subscribe to the streams from the other computer. As both user computers have subscribed to the whiteboard (joined a session), when a drawing occurs on one computer a shared database will update that drawing change on the other computer. For example, a room (or session) identifier may be identified with all participants in a room to identify all those in a session.

Figure 11:
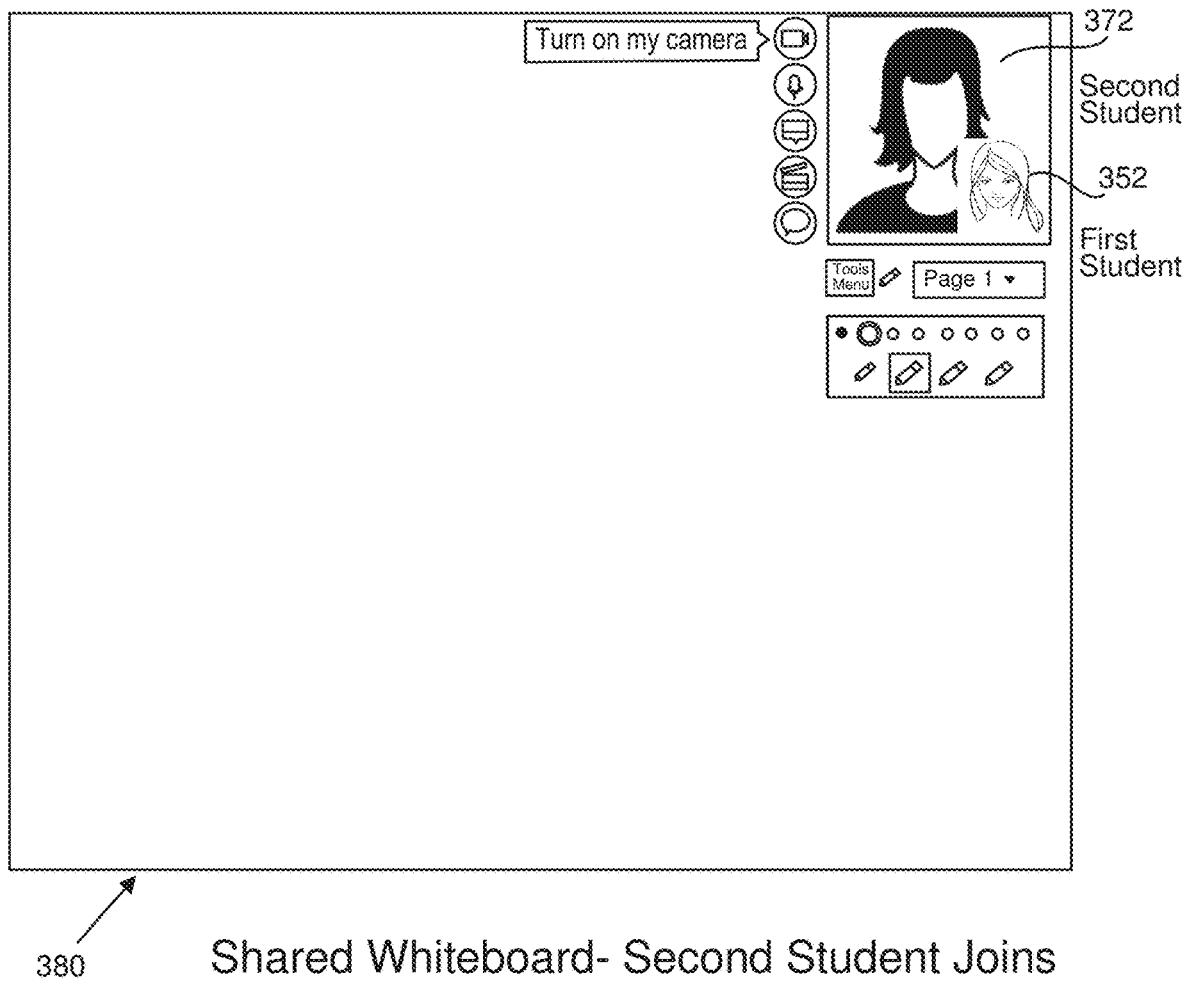
FIG. 11 is a view of the session after the second student has joined.

FIG. 11 is a screenshot showing a view 380 of a session after the second student has joined. The session appears the same except that now a video image 372 of the second student appears on the display screen of the second student's computer and video image 352 of the first student is now smaller and shown as a picture-in-picture image. Of course, picture-in-picture is not necessary, both video images may be the same size (or may be different sizes) and it is not required that images be shown, although it is useful for a group session. Further, it is not required that videos be shown; still images of each participant may also be used. The display screen of the first student's computer will show a nearly similar view except that images 352 and 372 may be reversed. Any number of other students may join this group session as described above.

Although the entire browser (i.e., browser name, tabs, browser tools, address bar, etc.) of each student computer is not shown in either FIG. 9 or 11 (for simplicity), the address bar of the browser on each student computer may reflect a Web site to which the browser is connected as well as the unique identifier for the session in which both students have now entered. For example, the address may be "https://studyedge.goboard.com/18eb97", where the identifier "18eb97" uniquely identifies a particular session (or room identifier) in which both students are present. An example of such an address is shown at 351 in FIG. 7 of a recently created shared whiteboard session, showing unique identifier as "a5efd2." Application 101 executing in conjunction with this Web site, as well as the browser of each student computer, may use this session identifier not only to identify which students (or rather, which student computing devices) are present in a particular session, but also to distribute drawing changes to the computing devices of that session in order to update the shared whiteboard of each, as will be described below in step 628.

Record Session—High Level

Figure 12:
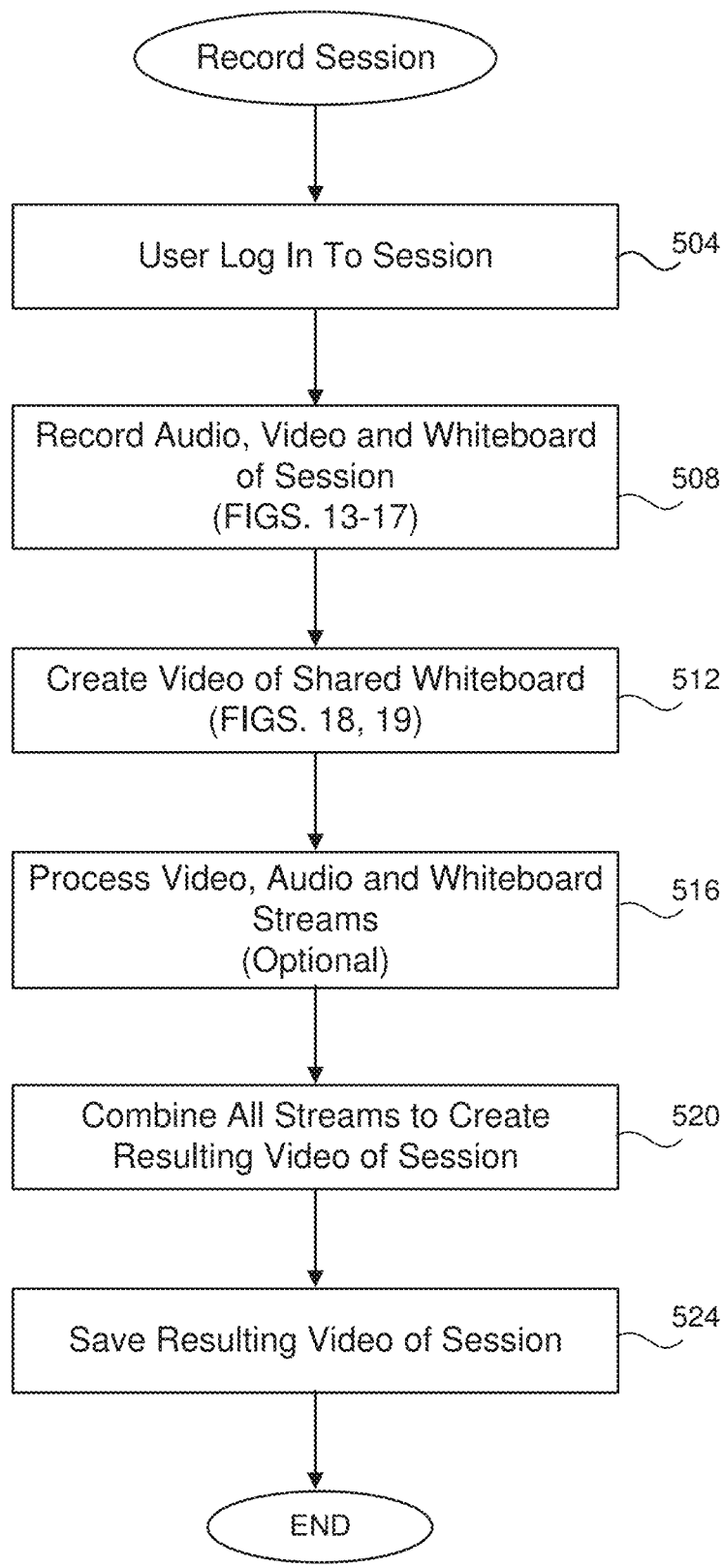
FIG. 12 is a flow diagram describing at a high level how a session is recorded.

FIG. 12 is a flow diagram describing at a high level how a session is recorded. In a first step 504 one or more users login to a particular session having a unique identifier such as has been described in FIG. 4 and shown in the previous drawings. For example, FIG. 11 shows a particular session in progress in which two users have joined. As mentioned earlier, only one user may be present in the session and the present invention will still record this session and create a resulting video as described below, although recording a session with multiple users is preferable.

As described earlier, each user has communicated with the STUN/TURN server thus enabling each user to communicate with one another and to share the electronic whiteboard. Each user will create three streams of information: one is the video stream from the camera that the user has enabled on their device, second is an audio stream from the microphone of the user's device, and third is a stream of drawing actions that the user creates when modifying the electronic whiteboard on their own screen.

In a next step 508 the audio, video and whiteboard streams of each user are recorded, as will be described in greater detail below. In general, these streams may be sent to the database computer 96 and the recording computer 98 in real time as the streams are created, or these streams may be recorded on each user computer and sent to computers 96 and 98 after the session has been completed. Preferably, in order to reduce processing power and storage on the user device, the streams are sent in real time to computers 96 and 98.

In step 512 a video of the shared whiteboard changing over time is created using information from the action log in the shared database of computer 96. This video shows evolution of the whiteboard over time exactly as if an external video camera had filmed a screen of a user computer showing the whiteboard as it changes.

In an optional step 516 each audio, video and whiteboard stream may be processed in order to create a video clip as designated by a user. Basically, each video, audio and whiteboard stream is clipped based upon timestamps provided by the user. Alternatively, this clipping may occur after step 520 upon the resulting video stream. Implementation of creating a video clip of the session will be described in greater detail below with reference to FIGS. 21A and 21B.

In step 520 all of the stored streams are combined including the video stream from each user, the audio stream from each user, and the video of the whiteboard created in step 512 in order to create and export the resulting video of the session. It is not strictly necessary that the audio and video streams be combined with the whiteboard video, but it is preferable. In step 524 the resulting video is saved into persistent storage onto a suitable computer such as recording server computer 98. This resulting video may then be displayed to a user on a computer, made available via a Web site, sent via electronic mail or other communication means to a user, made available upon a cloud service for downloading, etc. Advantageously, the resulting video of the session appears as if a video had been recorded of the session in real time, showing all whiteboard changes, videos of the users and their audio.

Record Video and Audio Streams

Figure 13:
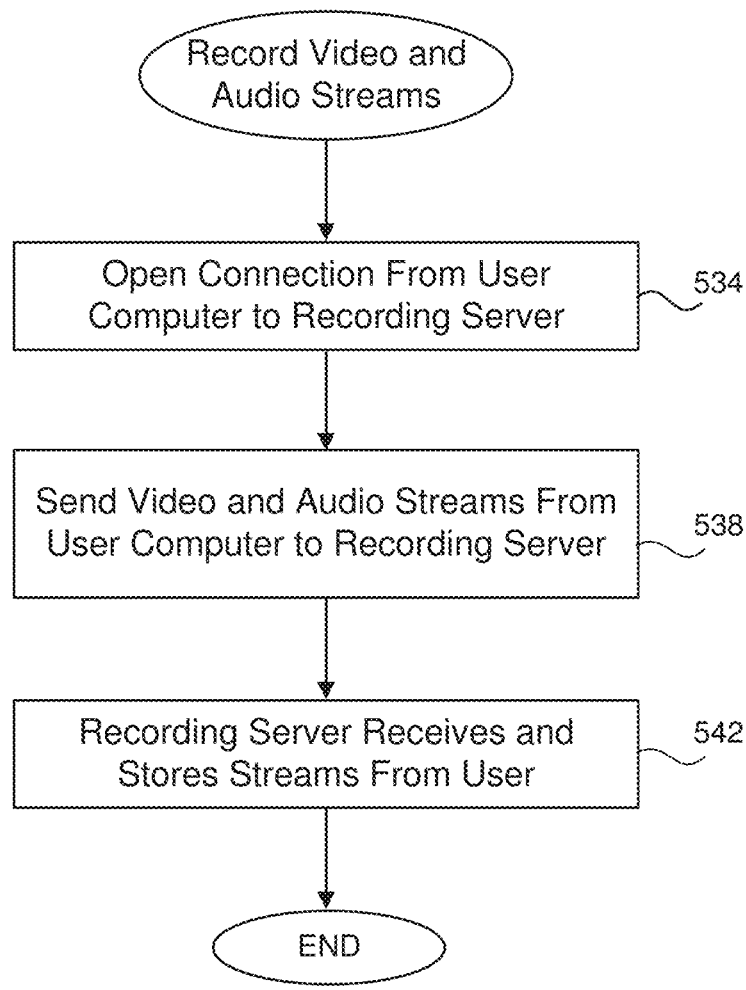
FIG. 13 is a flow diagram describing one embodiment by which the video and audio streams from a user computer are stored to the recording server computer.

FIG. 13 is a flow diagram describing one embodiment by which the video and audio streams from a user computer are stored to the recording server computer 98. This flow describes the storage of the video and audio streams of step 508 for a single user computer; each other user computer that has joined the current session performs these same steps in order to store their respective video and audio streams. In this embodiment, it is assumed that the entire session will be recorded and accordingly a connection will be opened and streams recorded as soon as the user joins the session.

In a first step 534 the user computer (e.g., user device 92) opens a connection to a recording server on computer 98. The browser on the user's computer opens this connection (typically using JavaScript) using software loaded when the whiteboard application 101 was loaded onto the user's computer in step 204 (or is opened using the GoBoard application of a tablet or mobile telephone). The recording server acts as if it were another participant in a session in order to receive the video and audio streams. Any suitable protocol for the network connection may be used such as WebRTC or a peer-to-peer JavaScript connection. Depending upon the connection used, the recording server subscribes to the user computer streams or is forced to subscribe to the streams. This step may be performed at any time after the user opens the application in step 204. As part of step 534 the user computer sends identifying information with the streams including the room identifier or session identifier, an identifier of the user, etc., so that the streams may be identified and recombined as will be described below.

In step 538 both the video and audio streams from the user computer are sent over the network connection to the recording server on computer 98 continuously during the session. Once the user logs out of the session (by closing the application, closing the browser, or if any one user clicks the "Logout" or "End Session" button, etc.) then his or her computer ceases sending the video and audio streams to the recording server.

In step 542 the recording server receives both streams continuously and stores these streams along with their metadata on computer 98 in persistent storage such as on hard disk, on a solid-state disk, in flash memory, etc.

Record Shared Whiteboard

Figure 14:
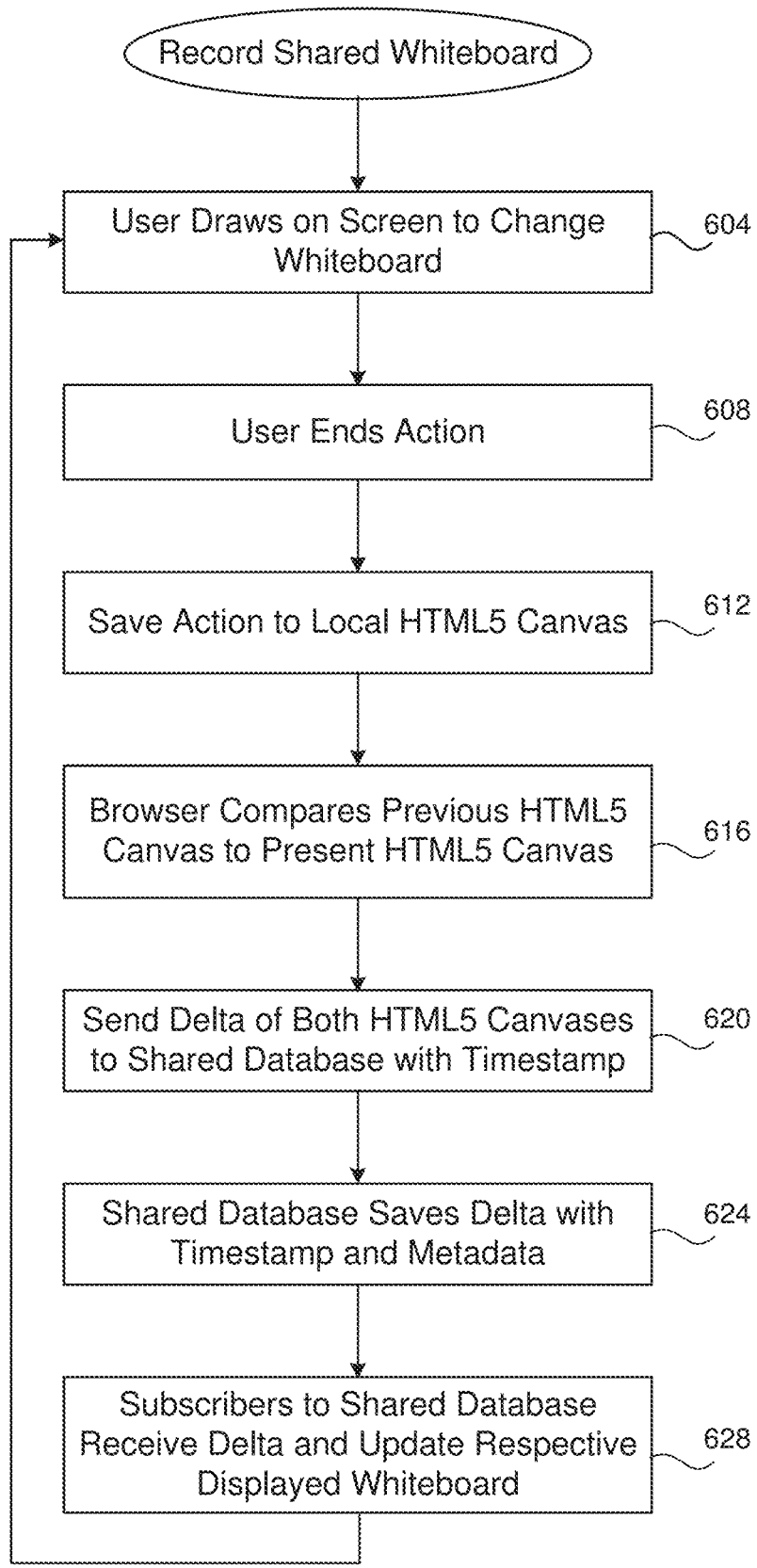
FIG. 14 is an embodiment of recording the shared whiteboard that uses minimal bandwidth.
Figure 16:
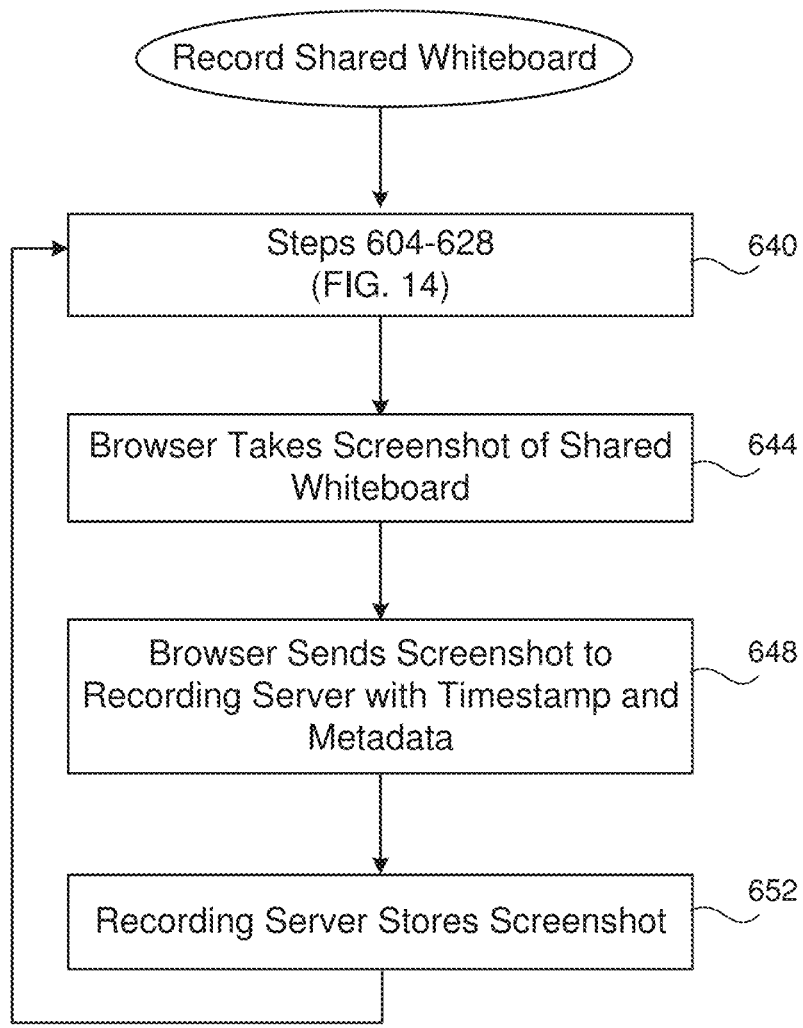
FIG. 16 is an embodiment in which user-based screenshots are taken asynchronously.
Figure 17:
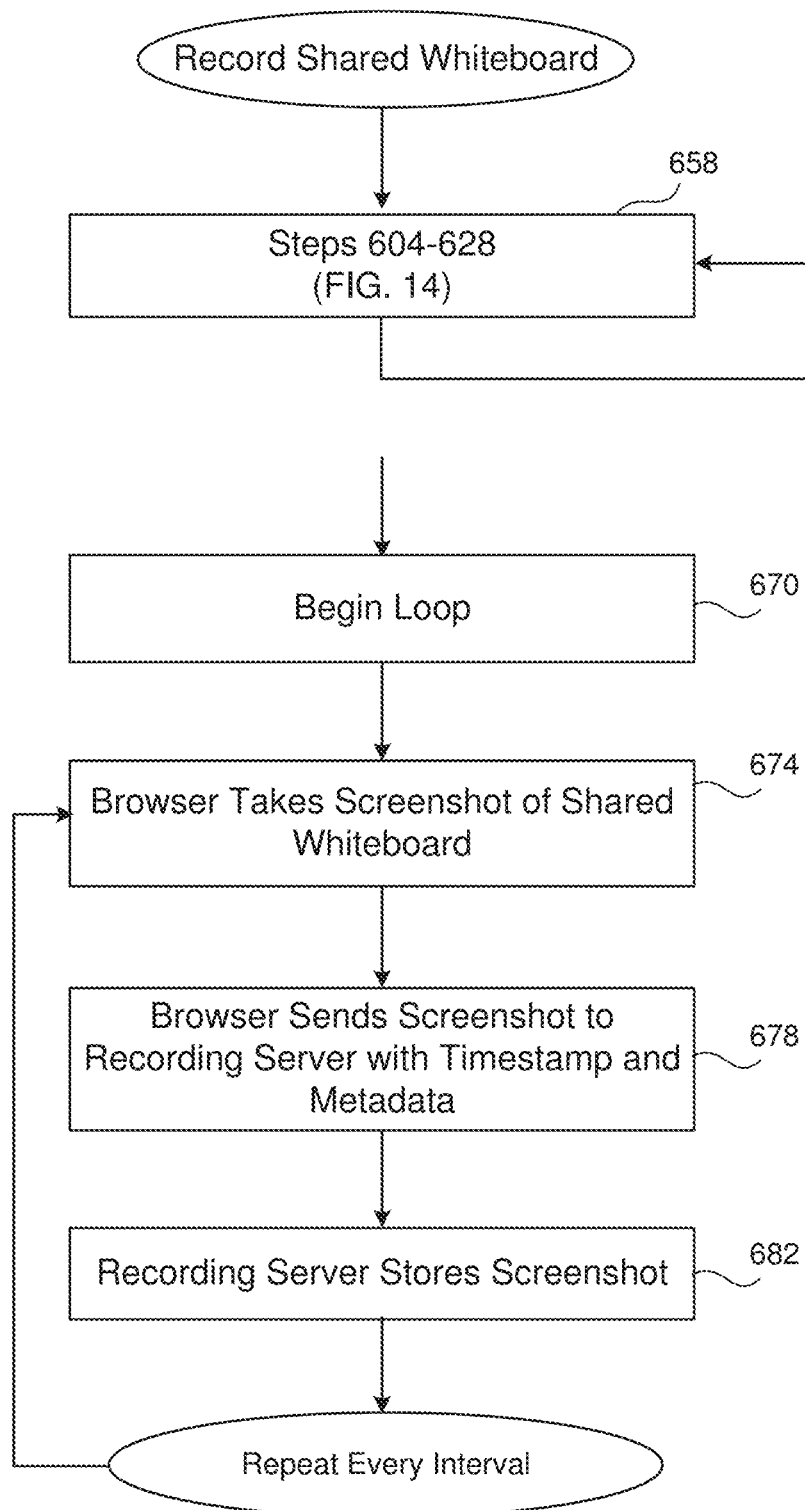
FIG. 17 is an embodiment in which user-based screenshots are taken periodically.

FIGS. 14, 16 and 17 described embodiments by which drawing actions that occur on the shared whiteboard (from any number of users using different computers) are stored for later use in creating a video of changes to the shared whiteboard over time. More specifically, FIG. 14 is an embodiment of recording the shared whiteboard that uses minimal bandwidth. FIG. 16 is an embodiment in which user-based screenshots are taken asynchronously, and FIG. 17 is an embodiment in which user-based screenshots are taken periodically.

Figure 15A:
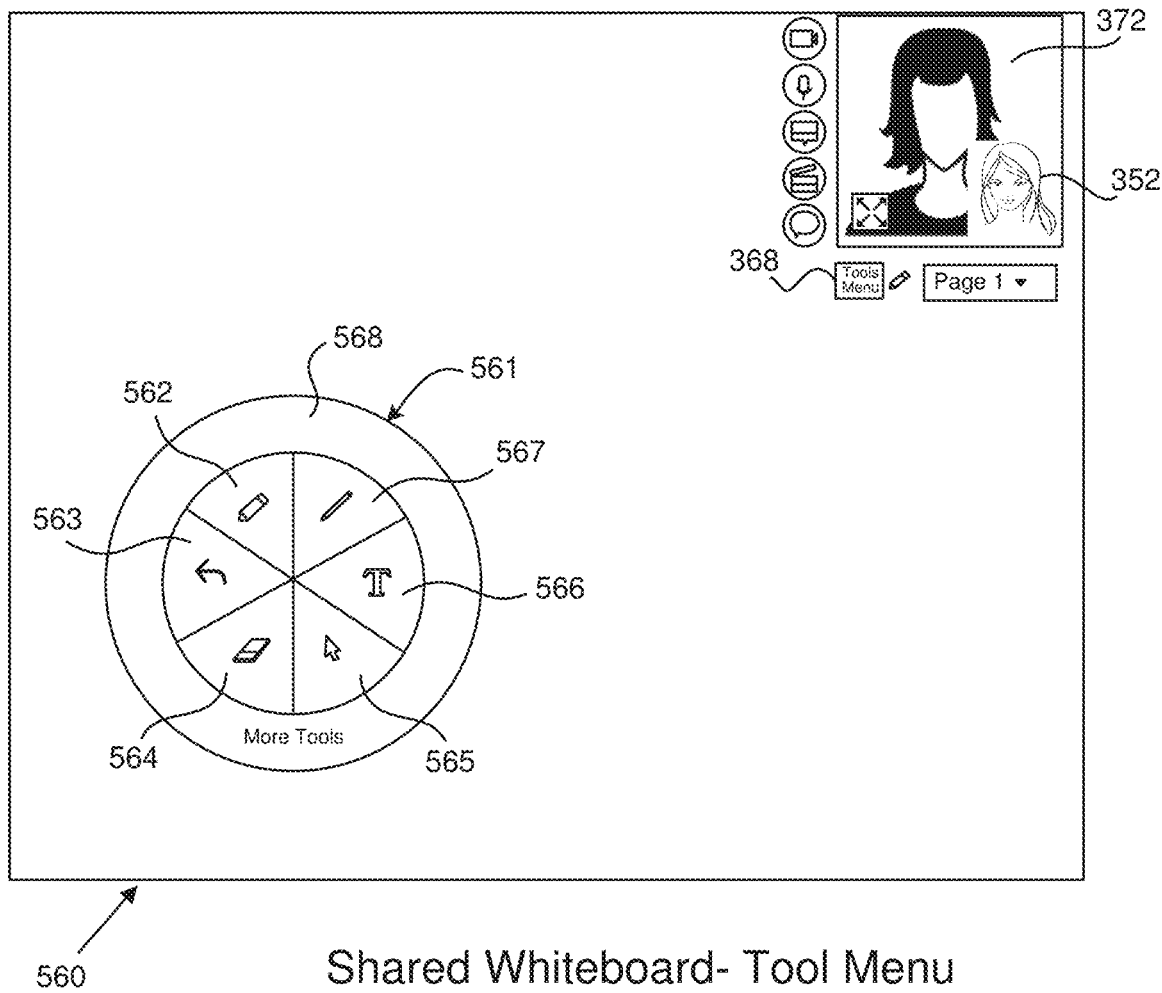
FIGS. 15A-15D illustrate a simple shared whiteboard that will be referred to in the following descriptions.

FIGS. 15A-15D illustrates a simple shared whiteboard that will be referred to in the following descriptions. FIG. 15A shows a view 560 of a session that includes first user 352 and a second user 372. This is a continuation of the session first begun by the first user as shown in FIG. 9 and in which the second user joined as shown in FIG. 11. The second user on his or her computing device has clicked upon (or selected in some manner) tools menu button 368 thus causing tools menu 561 to appear on the shared whiteboard, that is, both on the screen of the second user computing device and upon the screen of the first user computing device. Tools menu 561 includes a variety of tools and actions for creating drawing changes on the shared whiteboard. Tool 562 is a pencil or laser for drawing lines; tool 563 is an undo or redo option; tool 564 is an eraser or clear button (for clearing the entire whiteboard page); tool 565 is a selection arrow; tool 566 allows the user to enter text from a keyboard onto the shared whiteboard; tool 567 allows the user to draw a line or a variety of shapes; and, outer ring 568 allows a user to select even more tools (described below).

Figure 15B:
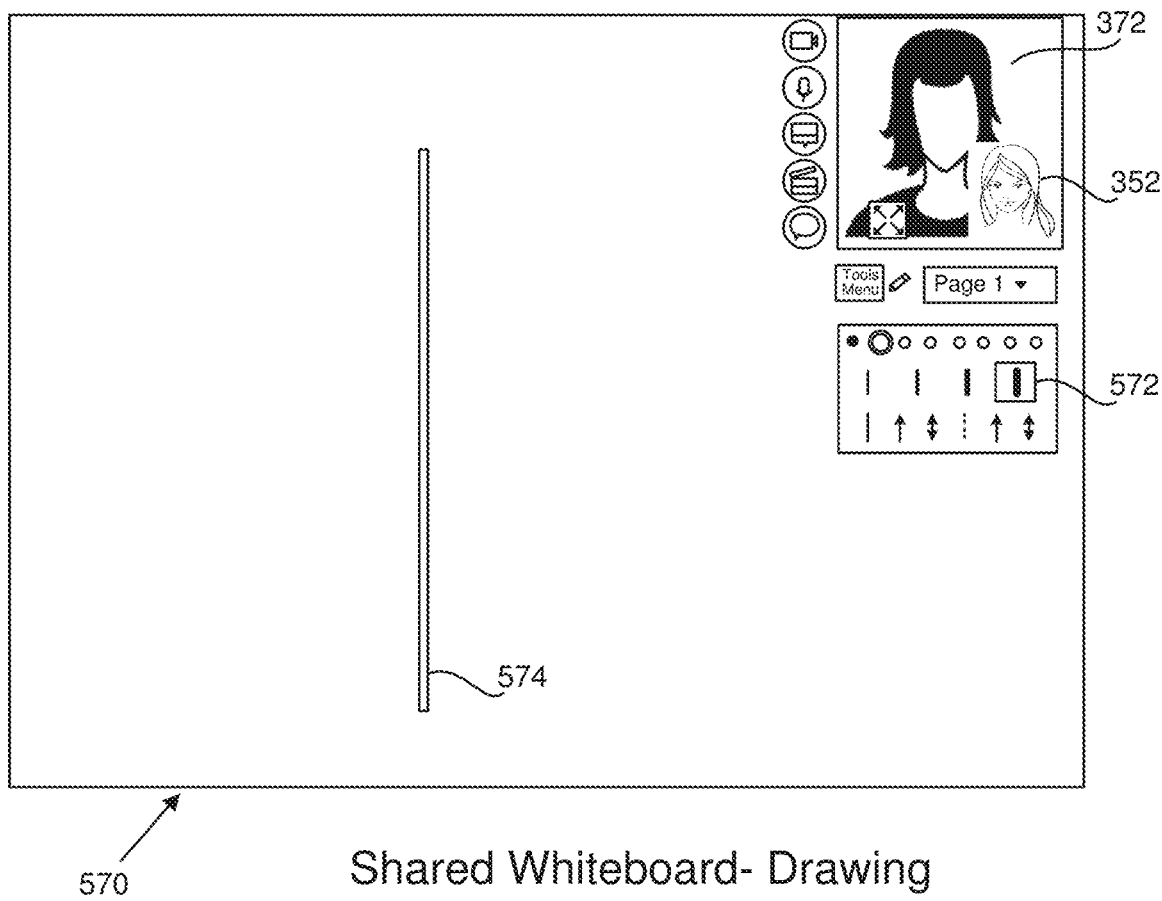
Figure 15C:
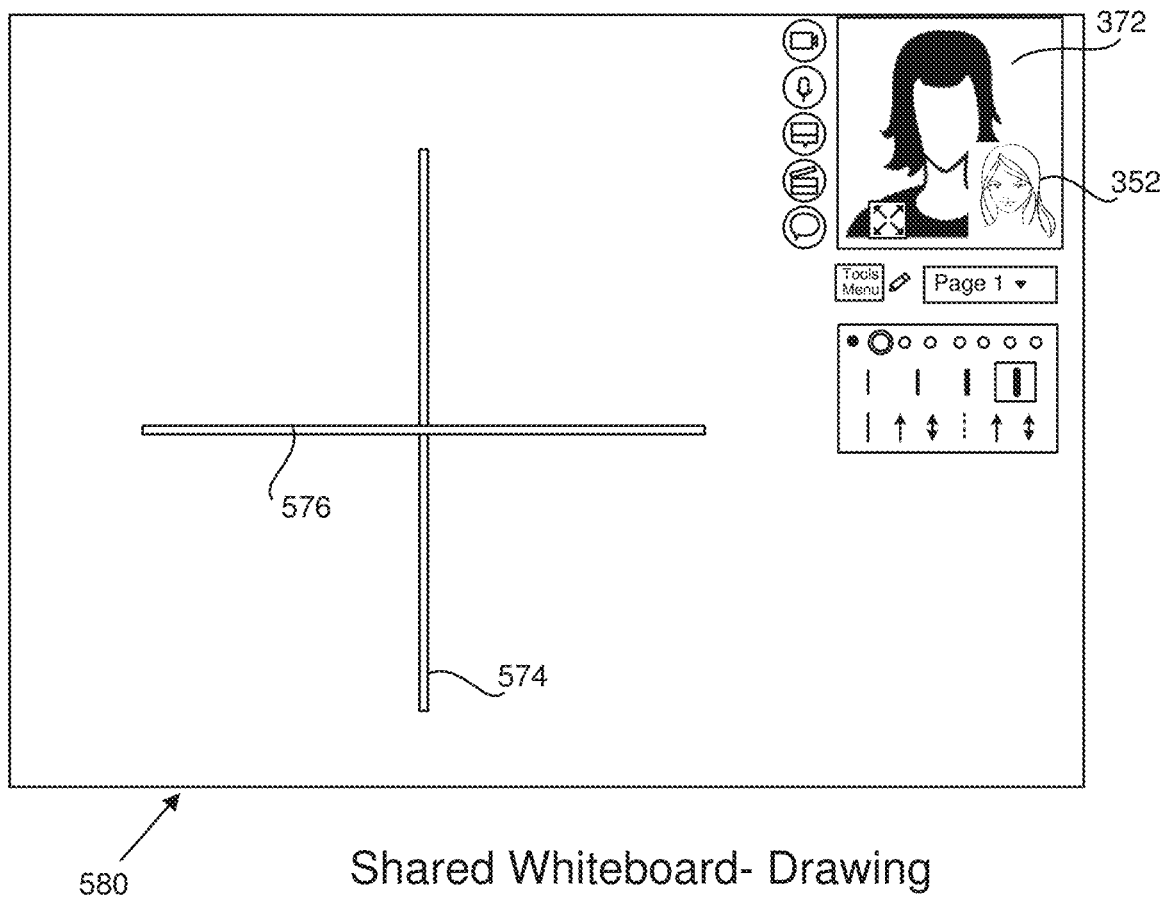
Figure 15D:
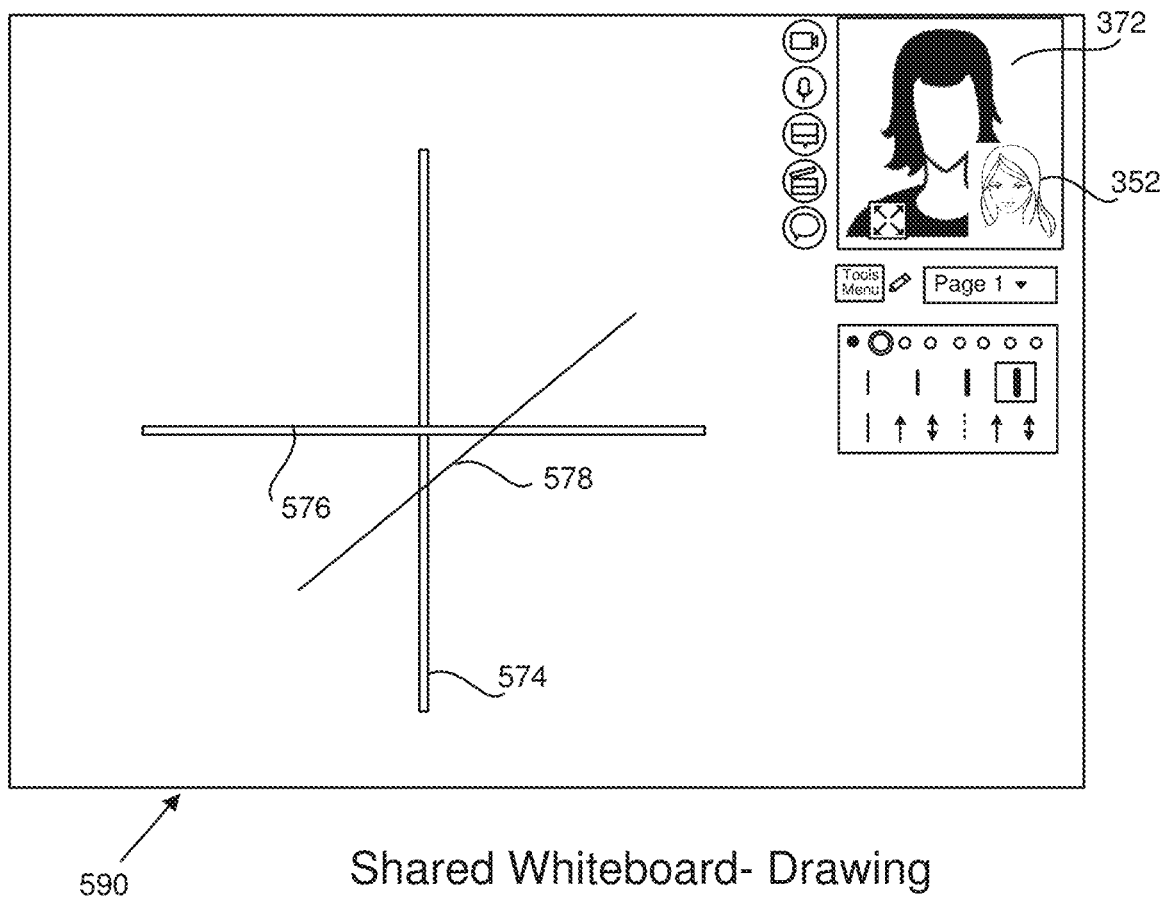

FIG. 15B shows a view 570 in which the second user has selected the line drawing tool, bringing up one selection options 572, and in which the user has then drawn vertical line 574. FIG. 15C shows a view 580 in which the second user has then drawn horizontal line 576. FIG. 15D shows a view 590 in which the second user has finally drawn line 578 having a particular slope, presumably for demonstrating the concept of line slope and its equation for the first user. As will be explained in greater detail below, each of views 560-590 is a subsequent version of the shared whiteboard that is saved internally by the user computing device, using, for example HTML5 Canvas functionality.

FIG. 14 is a flow diagram describing one embodiment by which changes to the shared whiteboard (by one or more users) are stored to the database server computer 96. This flow describes the recording of the whiteboard of step 508 from the perspective of a single user computer; each other user computer that modifies the shared whiteboard in the session performs these same steps in order to store their own changes to the shared whiteboard.

In a first step 604 the user of the computer draws on the screen (or takes other action) in order to change the shared whiteboard. The user may use any of the drawing tools shown in FIG. 15A and typically uses the computer mouse, voice, a touchpad, keyboard, or other computer input in order to manipulate these drawing tools. Alternatively, if using a tablet computer with a touchscreen, the user may draw by using a pencil, stylus, finger, digital pen, or other similar instrument. The user may draw a line, arc, circle, shape, etc., may move a line, shape or object, may change color, may upload a photograph, add text, or make any other change such as shown in the tool menu of FIG. 15A. All of these changes are implemented by the previously downloaded application software in the browser of the user computer (or in the application of a tablet or mobile telephone) which renders the whiteboard and these drawing changes on the display of the user computer.

At some point, step 608 the user will end his or her drawing action such as by lifting the stylus or pencil (in the case of a touchscreen), or will end the action by releasing a mouse button, by clicking a button, by lifting a finger from the touchpad, ending a voice command, etc., such that the current drawing change ends. The end of this drawing action is a signal to the application software in the browser in step 612 to save this action to the local HTML5 canvas element. As known in the art, an HTML5 canvas is a representation of a graphic whiteboard used by the browser of the computer to store the whiteboard and to render it on the user's computer. Typically, this whiteboard is implemented as a local JSON array although other representations such as a local or shared in-memory database such as MongoDB or Redis may also be used. FIG. 15B shows the drawing action of a line 574 which has ended.

The user browser will also store the last version of the HTML 5 canvas (i.e., the state of the whiteboard before the current drawing action) in addition to the current version. It is also possible to store each version of the HTML 5 canvas as each drawing action is completed, but this is not strictly necessary. For example, view 570 shows a last, or previous version of the whiteboard while view 580 shows the current version after the line 576 has been added.

The end of the drawing action is also a signal to perform step 616 in which the browser (or application) compares the present version of the HTML5 canvas (which has just been saved with the new drawing change) to the last version of the HTML5 canvas that does not include the drawing change. This comparison is basically a subtraction of one canvas from another, which results in the "delta," i.e., the recent drawing action, such as the recently drawn line. For example, view 580 shows a recently drawn line 576. When view 570 is subtracted from view 580 what remains is the line 576, i.e., the "delta."

It is also possible to produce the "delta" from one version of the HTML5 canvas to the next by simply recording the new drawing action instead of comparing between two versions. In the simple example immediately above, the new action is the line 576. It is advantageous, however, to perform a comparison between the present HTML 5 canvas and a previous HTML 5 canvas in order to definitively capture all changes that have been made to the whiteboard since the previous version. If each new drawing action is recognized and sent individually, it is possible that one or more of these drawing actions may be missed and not recorded because of a computer malfunction, network error, etc. In one particular embodiment, a previous version of the HTML 5 canvas is saved until it is compared to the current version and the "delta" is produced. For example, if view 570 is saved as the last version of the HTML 5 canvas, but malfunctions prevent view 580 from being recognized as a drawing action and sent, when a drawing action completes view 590, this view 590 will be compared to view 570 (and not to view 580) thus capturing all changes between view 570 and view 590. At this point, view 570 may be discarded and view 590 will then be saved as the last or previous HTML 5 canvas.

In step 620 this delta from the comparison of the HTML5 canvases is sent to the shared database in computer 96 along with the timestamp of when the drawing action occurred. Each drawing action by the user, ending with some event such as described in step 608, results in the delta being sent to the shared database such that the shared database then reflects a series of drawing actions in chronological order along with data indicating the type of drawing, where it occurs in the whiteboard, length, shape, etc. In the case of an HTML5 canvas, what is sent is a portion of the JSON array. Advantageously, it is not necessary to send an image, screenshot, video, etc. of the drawing change in this embodiment, thus greatly reducing the amount of bandwidth required increasing the speed at which the shared whiteboard can be updated on the other users screens. In general, the invention differentiates between sending data that describes a drawing action as opposed to sending an image of the drawing action. The data that describes is far more compact and faster to send than an image of the drawing action. In addition, with each action sent to the shared database, there is a "Type" flag which identifies which type of action or object is represented; e.g., a shape, a line, an equation or otherwise. It is also possible to send an image if necessary, and such would be identified by a Type of "image" and a URL.

The shared database includes chronologically a number of drawing actions stored. In general, instead of an image of each drawing action (or a video as it is being drawn), the table stores data defining the action. For example, lines may be represented by two points in space along with a width. Shapes (circles, squares, triangles, etc.) are also represented by points in space, and a fill pattern. Arcs or sketches drawn by a pencil tool may be represented by numerous points in space. An undo or redo action simply remove the previous action (undo) or performs the previous action again (redo).

An eraser action using the eraser tool is also represented by points in space and a width, with the result that any previous drawing falling under the path of the eraser tool will be removed. Text may be represented by the characters themselves or their ASCII codes. Each drawing action may also have an associated color.

Representation of more complex items such as inserted calculators, equation editors, insertion of photographs, timers, etc. (accessible under the More Tools option 568 of FIG. 15A) may also be handled using a Type flag for the object, e.g., a Type of "image" for a photograph. For equations in particular, they can be saved to the shared database as either an image, or, more optimally, in LaTeX format (an abstracted programming language for generating equations and graphs).

Step 624 the shared database in computer 96 saves this delta along with a timestamp and metadata for the action such as user identifier, room identifier, user name, IP address of user computer, etc. Instead of the timestamp coming from the user computer along with the delta, is also possible for the shared database to assign its own timestamp when the delta arrives.

As mentioned above, any number of users may be in the same session viewing the same shared whiteboard, and may be drawing on the same whiteboard as described above in steps 604-624. Thus, the shared database may include the data for drawing actions not only from a single user, but also from other users as well who are drawing on the same shared whiteboard displayed on their respective computer screens. The shared database keeps track of these drawing actions from different users in chronological order such that the drawing actions from different users may be interleaved in the shared database. For example, although FIGS. 15A-15D show only the second user drawing on the shared whiteboard, it is possible, for example, that line 578 is drawn by the first user.

In step 628 the recent drawing action received in the shared database is sent to all subscribers of the shared database (i.e., to all users participating in the current session) in order that the browser (or application) of each computing device can update its respective displayed whiteboard, thus ensuring that the shared whiteboard appears the same for all users and that each user sees all changes that others have made. Typically, a drawing change that one user makes (the "delta") will be sent to all other subscribers within milliseconds. It is not strictly necessary that the recent drawing action is sent back to the user who created the drawing action because his or her display was updated in real time in step 604 and then saved in step 612. In this fashion, all changes to the shared whiteboard by all users in the session are displayed on all computing devices nearly instantaneously. Preferably, a user subscribes to the shared database (and whiteboard) for purposes of receiving whiteboard updates by entering a session using a particular room identifier or by accepting an invitation from someone in the session. The subscription happens upon joining a shared room or upon accepting an invitation.

Recording of the shared whiteboard as described in FIG. 14 is advantageous because bandwidth intensive screenshots, images and videos of drawing actions occurring on a user's screen are not recorded by a particular user computing device, are not stored, and are not sent to the database server. Only minimal data that describes the drawing action need be sent to the database server.

FIGS. 22-25 show in detail an example of how drawing actions may be stored in the shared database, moved and deleted or otherwise manipulated, and sent to other users. In general, basic drawing actions include a stroke, line, circle, color change, text edit, erase, move, etc. There may be two or more subsequent actions each by the same user or by different users that operate upon a given drawing action. The code described below is JSON objects that denote a series of example drawing actions performed on the shared whiteboard such as adding shapes, strokes, an image, and deleting, moving, resizing, changing color, performed by two different users. The below code uses specific formatting between users during a live session; the formatting used by each object may slightly differ when saved to the shared database or when merged into the shared whiteboard stored locally on a user computer.

FIG. 22 is a portion of a JSON file representing a normal stroke made on a shared whiteboard. In operation, a first user has made this stroke on his or her shared whiteboard and this code represents what is sent to the other subscribers in step 628. A similar version of this code (in a different format) is stored to the shared database in step 624 to represent the stroke that the first user has made. Shown is an action "add" 1010 indicating that this stroke has been added to the shared whiteboard and that each subscriber computer should add this stroke to their local representation of the shared whiteboard. Relevant data includes a color of the stroke 1020, the page number 1022 of the shared whiteboard, a stroke width 1024, a unique object identifier 1026, a type 1028 and a kind 1030, whether the stroke may be handled 1032, whether the stroke may be highlighted in 1034, and segments 1036 indicating where the stroke is located. As shown, segments 1036 include five data points within the grid indicating that this stroke is a fairly simple curve having five segments. Also shown is a last user identifier 1040 indicating that this particular user was the last person to modify this drawing action, and another user identifier 1042 indicating which user initially performed the drawing action. The last user identifier 1040 is relevant to indicate which user most recently modified the drawing action such as by resizing, moving, deleting, changing color, etc.

A variety of other drawing actions may also be represented in this fashion including any of those described within this specification. In particular, a straight line is represented similarly: it has a kind and type of both "line"; and has only two data points to describe it. A dashed line has a kind and type of both "dashed," and also only had two data points. A double arrow line may also be represented in a more complex fashion by using a variety of lines and shapes. A circle shape includes a kind of "circle" and a type of "shape," as well as numerous data points, whether it is closed or not, and its fill color. A filled square shape includes a kind of "rectangle" and a type of "shape," whether it is filled or not, a fill color, whether it can be resized, if it uses a bounding box, stroke color, stroke width, and four data points. Other shapes such as pentagons, triangles, etc., can be represented in a similar fashion as the above shapes. An image may also be an added to the shared whiteboard and its JSON code will include: its unique identifier, a type and kind of both "raster," a source indicating the URL where it may be found, whether it is a PDF page, its aspect ratio, whether it may be handled or highlighted, whether uses a bounding box, whether it may be resized, its width and height, any size limit, and the position within the display where it should be placed.

FIG. 23 is a portion of a JSON file representing moving an image on a shared whiteboard. In this operation, a second user has moved an image on the shared whiteboard and this code represents what is sent to the other subscribers in step 628. A similar version of this code (in a different format) is stored to the shared database in step 624 to represent this move. Shown is an action "move" 1110, the location 1120 to where the image should be moved, the last user identifier 1122 indicating the second user that performed this move, and a unique object identifier 1124 that identifies this image on the shared whiteboard. In this situation, a first user added the image to the shared whiteboard and a second, different user moved the image. Of course, any other objects placed or drawing actions performed upon the shared whiteboard may also be moved using similar code.

FIG. 24 is a portion of a JSON file representing deleting a stroke on a shared whiteboard. In this operation, a second user has deleted a stroke on the shared whiteboard and this code represents what is sent to the other subscribers in step 628. A similar version of this code (in a different format) is stored to the shared database in step 624 to represent this deletion. Shown is an action "delete" 1210, the last user identifier 1220 indicating the second user that performed the deletion, and a unique object identifier 1222 identifying this stroke. In this situation, a first user added the stroke to the shared whiteboard and a second, different user deleted the stroke. Of course, any other objects placed or drawing actions performed upon the shared whiteboard may also be deleted using similar code.

Not shown in the above is a raw JSON export of the shared whiteboard showing all of the drawing actions performed upon that have been merged and how they are saved into the "draw" property of the room/session in the Firebase database. This raw JSON data is referenced in the session object described immediately below.

FIG. 25 is JSON code representing an entire session object 1310 (i.e., a room in which one or more users are interacting with a shared whiteboard) that is stored within the shared database. This figure is an export of the entire session object including the session information, the shared whiteboard (i.e., the drawing), and metadata such as user metadata, background, pages, any subdomains, etc. The session object 1310 includes a creation date, a user identifier who created it, and an indication of the raw JSON data 1330 referred to immediately above (including its location, where to find the code, or the actual code itself). Shown at 1320 is unique session identifier for this particular session.

FIG. 16 is a flow diagram describing one embodiment of step 508 in which changes to the shared whiteboard (by one or more users) are stored to recording server computer 98. In this embodiment, when the user draws on his or her screen, step 604-628 will still occur, allowing subscribers to the shared database to receive updates in order to update their respective whiteboards. In addition, user-based screenshots will also be used in order to create later a video of the shared whiteboard.

Step 640 is performed as described above. In step 640, once the user has performed his or her drawing action and the action has been saved to the local HTML5 canvas in step 612, it is possible for step 644 to occur, although typically step 644 will occur after step 640 has completed. In step 644 the previously downloaded whiteboard application code in the browser of user computer (or in the GoBoard application of a tablet or mobile device) instructs the computer to take a screenshot of the shared whiteboard (more specifically, a screenshot of the HTML5 canvas). Preferably, the screenshot includes the entire view of the shared whiteboard (i.e., views 560-590), except for the video box in the top right corner which will be added later when the streams are combined. It is also possible to include this video box in the top right corner and simply overwrite the video box with the actual video streams when the streams are combined later.

In step 648 the browser sends this screenshot to the recording server computer 98 along with a timestamp and metadata such as user identifier, room identifier, etc. As mentioned earlier, it is also possible for the recording server to provide the timestamp itself rather than relying upon the timestamp from the user computer. In step 652 the recording server stores this screenshot into persistent storage such as on a hard disk, a solid-state disk, flash memory, etc.

FIGS. 9, 11, and 15A-15D each show a view in which a drawing action has occurred; accordingly, a screenshot will be taken after each action, resulting in a series of six screenshots which will be recorded. FIG. 9 may be considered the first drawing action in that the screen appears for the first time. The steps of FIG. 16 are performed for each drawing action occurring on each user computer participating in the current session. Thus, any user may perform a drawing action on his or her shared whiteboard, a screenshot will be taken and recorded along with a timestamp so that a chronological series of screenshots are recorded, possibly including interleaved screenshots of the shared whiteboard from different users in the session. Advantageously, each drawing action occurring on any user computer is captured by a screenshot. This embodiment, however, requires extra processing power, storage and bandwidth to take a screenshot and send it to the recording server. This embodiment is also not able to capture the intermediate movements of the drawing action as the user is moving a mouse or pointer, before the mouse is released and the drawing action has ended. For example, when drawing line 574, the user may lengthen the line, shorten it, move it from side to side, before settling on its final end point and releasing the mouse button to complete the drawing action. The screenshot captures the final, entire line, but not its intermediate movement as the user is drawing the line. Nevertheless, for sessions where drawing actions are few and far between, or for when drawing actions are separated by a relatively long length of time, this embodiment works well because a screenshot is taken only when necessary.

Once the screenshots have been stored on the recording server, backend server code is used that allows the server to emulate a browser (with no human involved). By emulating the browser and inputting the screenshots of the whiteboard changing over time, a video may be created of the whiteboard changing as will be described below.

FIG. 17 is a flow diagram describing one embodiment in which changes to the shared whiteboard (by one or more users) are stored to recording server computer 98. In this embodiment, there are two parallel flows. When the user draws on his or her screen, steps 604-628 will still occur, allowing subscribers to the shared database to receive updates in order to update their respective whiteboards. In addition, in parallel, user-based screenshots will be saved periodically in order to later create a video of the shared whiteboard. By contrast with FIG. 16 in which each screenshot is dependent upon and occurs after a user ends an action, the screenshots of FIG. 17 are taken regardless of any action from any user.

Accordingly, step 658 occurs as described above. Step 670 begins a loop in which the browser of each user computer (or the application) in the current session takes periodic screenshots. This loop may begin as soon as a user enters a session or may begin when the user begins his first action or after completing the first action. In step 674 the browser of the user computer instructs the computer to take a screenshot of the shared whiteboard (more specifically a screenshot of the HTML5 canvas). As in the previous embodiment, the screenshot may be the entire view of the shared whiteboard or may exclude the video box in the top right-hand corner.

In step 678 the browser sends the screenshot to the recording server computer 98 along with a timestamp and metadata such as that described above. It is also possible for the recording server to provide a timestamp itself. In step 682 the recording server stores the screenshot into persistent storage as described above. As shown at 686, this loop is repeated every interval, such as every one second, five seconds or fifteen seconds. The frequency of the interval will affect the quality of the video, namely, shorter intervals increase the frame rate and produce a higher quality video (at the expense of bandwidth), while longer intervals will produce a lower quality video but will use less bandwidth. Intervals as long as one minute, five minutes or more may also be used in situations where the resulting video will be used for compliance rather than for review. Intervals shorter than one second are also possible. The loop continues until the session ends, such as when all users exit from the session or after a timeout occurs.

Using the example of FIGS. 15A-15D, this embodiment will capture not only each completed drawing action (such as each line drawn), but also the intermediate movements of the line or shape as it is being drawn. For example, if the user begins to draw line 578 at one point and takes approximately 5 seconds to extend the line and choose the desired angle before reaching the final point and releasing the mouse to complete the drawing action, this embodiment will capture the intermediate movements in a series of five screenshots assuming that a screenshot is taken every second. Any other intermediate movements for shapes, text, or other drawing changes before the drawing action is completed and will also be captured by this embodiment assuming that screenshots are taken at such a frequency that screenshots are taken while the drawing action is still in progress. In general, the term "intermediate movements" refers to those movements of the drawing by user that occur from the moment the drawing action begins until the drawing action ends. One advantage of this embodiment is that based upon the frequency of the screenshots, a smoother and more complete whiteboard video can be created. Of course, this embodiment requires more processing power, more storage and more bandwidth, depending upon the frequency of the screenshots.

Figure 21A:
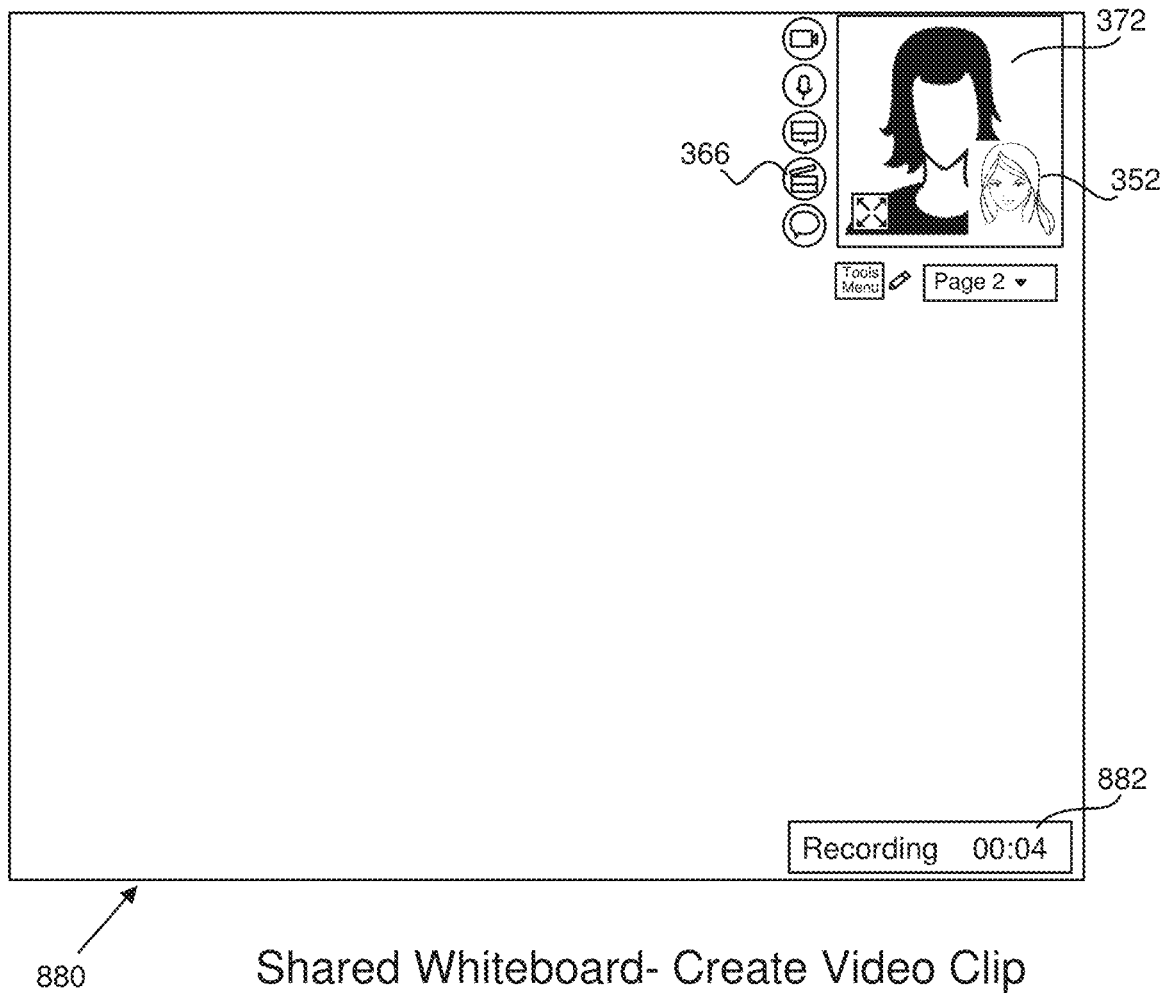
FIG. 21A-21B show how user may create a video clip during a session.

As described above, a drawing action may be any drawing that a user makes upon his or her screen using, for example, any of the drawing tools shown in menu 561. In addition, a drawing action may be the result of any action the user takes which results in a change occurring on the shared whiteboard, such as control actions. For example, selecting button 368 causes tools menu 561 to appear on the shared whiteboard. Or, selecting buttons 362-367, 354 may cause a change in the appearance of that button, may cause a dialog window to appear, a chat window to appear, etc. Or, selecting button 356 causes a drop-down menu to appear and allows the user to change the page, such as shown in FIG. 21A. Or, selection of the line tool 567 causes menu 572 to appear in FIG. 15B. Each of these control actions, while not actually resulting in a new drawing appearing on the shared whiteboard, is considered a drawing action in that the appearance of the shared whiteboard has changed. Thus, after each drawing action, the change to the shared whiteboard may be recorded as described above in FIG. 14, 16 or 17, resulting in recorded actions or screenshots which can then be used to create a video of the shared whiteboard which faithfully represents how the shared whiteboard actually changed over time as the users viewed it during the session.

In addition to the menu tools shown in FIG. 15A and described above, more tools are available by selecting region 568. These tools include generally the ability to display a calculator on the screen, import files or images, change the background or provide a grid, open a text chat window, open a sidebar to access links to a reference library of educational topics, open a library of video clips available in a dialog window, display a timer on the screen, change the language used in the shared whiteboard, access Wolfram Alpha resources via a link to a Web site, etc. In addition, specific tools are available for math classes (display graphing calculator, displayed equation editor, display a number line), chemistry classes (a bond drawing tool, curved arrows, etc.), physics classes (an equation editor, special shapes), and business classes (display table, display spreadsheet, etc.). Selecting this option 568 displays these options on the shared whiteboard and allows the user to choose one for displaying that option. The display of these options and using each of these options of is also considered a drawing action in that it changes the appearance of the shared whiteboard.

Create Video of Shared Whiteboard

Figure 18:
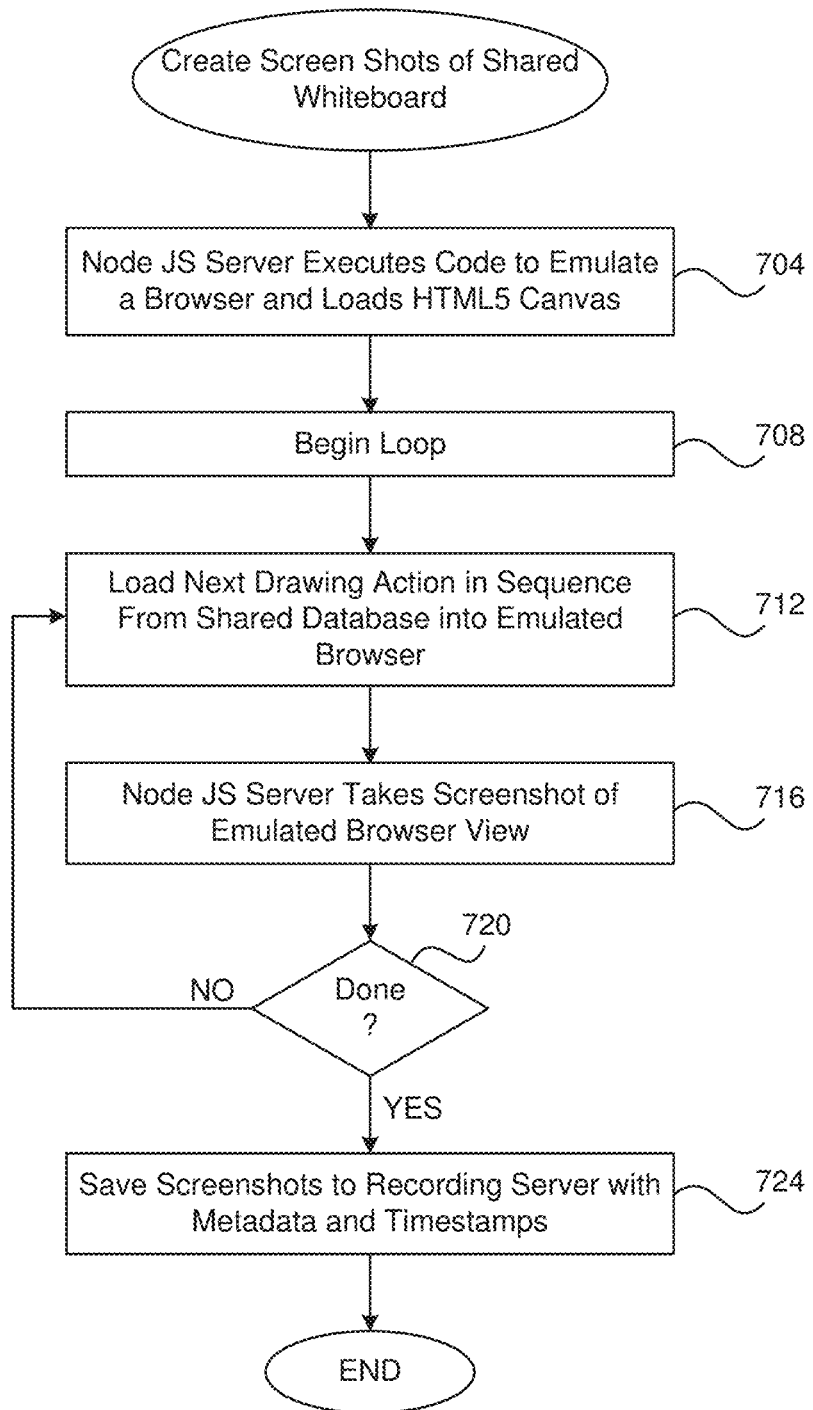
FIG. 18 is a flow diagram describing one embodiment in which screenshots of the shared whiteboard are created for later use in creating a whiteboard video.

FIG. 18 is a flow diagram describing one embodiment in which screenshots of the shared whiteboard are created for later use in creating a whiteboard video. This flow is used if the recorded drawing actions of the shared whiteboard of FIG. 14 and will be used to create screenshots. (If the drawing actions had been recorded using the flows of either FIG. 16 or FIG. 17 then screenshots of the shared whiteboard have already been recorded.) At this point in time a session has ended and all white board changes from all users in the session have been saved to the shared database server computer 96. Alternatively, the below flow may occur in real time while a session is in progress, for example after each change has been saved to the shared database. The below steps emulate a browser into which the previously saved drawing actions are loaded; this emulation allows a near exact rendering of how the drawing actions appeared originally in real time on the shared whiteboard. Advantageously, the created video will be a near exact match of how the drawing actions originally occurred during the session.

In a first step 704 a Node JS server executes code in order to emulate a Web browser and loads an HTML canvas. As known, a Node JS server is a server-side platform that is able to execute code such as Phantom JS in order to emulate a browser; such emulation may occur upon computer 96 or upon any other suitable processing server computer. Additionally, the same whiteboard software (e.g., the GoBoard software available from Study Edge, Inc.) previously loaded into the browser of a user computer is also loaded, thus providing the same blank whiteboard (and video box, buttons, tools menu, page number, etc.) that a user sees when beginning a session. This blank whiteboard provides the base upon which the drawing actions will be rendered. In this particular embodiment, the whiteboard software is implemented using the GoBoard JavaScript and HTML5 application. The canvas is a "Canvas" element in HTML which allows the rendering and manipulation of graphics within a browser more easily.

Next, in step 708 a loop begins in which each drawing action such as shown in Table 1 will be loaded into the emulated browser. In step 712 the next drawing action in sequence (or the very first drawing action in the table if this is the first time through the loop) is loaded from the shared database into the emulated browser. For example, as shown in FIG. 9 view 350 is loaded into the browser (assuming that a blank whiteboard is considered the first action). Subsequent drawing actions include the tools menu appearing in FIG. 15A, line 574 appearing in FIG. 15B, etc. This emulation, loading and representation of the drawing actions all occurs internally within the executing code, that is, no whiteboard is actually displayed on a screen, although if a display were connected to the processing server then the whiteboard would appear and would sequentially change as shown is in FIGS. 15A-15D.

Next, in step 716 the Node JS server takes a screenshot of the emulated browser window which appears as shown at 560. The server also saves the timestamp associated with this drawing action with this screenshot. If not all drawing actions from the shared database have been loaded, then in step 720 control returns again to step 712 and the next drawing action is loaded in a screenshot taken. In this simple example, three drawing actions are loaded from FIGS. 15A-15D, Y-axis 574, X-axis 576 and finally line 578 having a particular slope, a screenshot being taken after each drawing action is loaded. Once all actions have been loaded, and screenshots taken, then control moves to step 724. In step 724 the Node JS server saves all of these screenshots, each having an associated timestamp, along with relevant metadata (such as room identifier, etc.) to recording server computer 98. Thus, a series of screenshots representing all changes to the shared whiteboard during a session are saved, such as for example the screenshots shown at 560-590 (not including contents of video boxes 372, 352).

Figure 19:
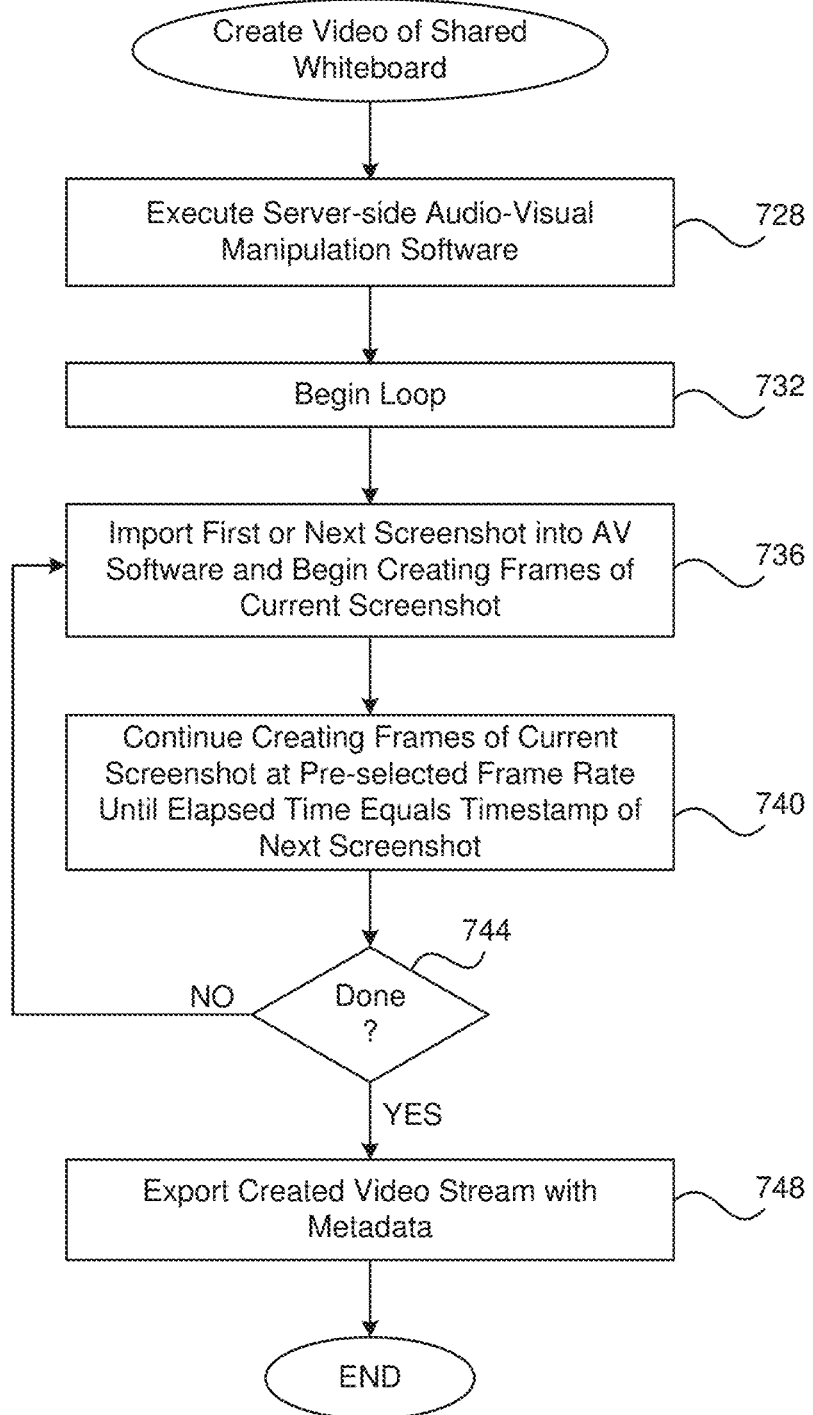
FIG. 19 is flow diagram describing one embodiment in which in a video of the shared whiteboard is created.

FIG. 19 is flow diagram describing one embodiment in which in a video of the shared whiteboard is created. This flow may be used whether the shared whiteboard was recorded using the flows of FIG. 14, 16 or 17. If FIG. 14 was used, then screenshots exist based upon FIG. 18; if FIG. 16 or 17, then the screenshots were created during those flows. At this point in time a session has ended and screenshots of that session have been saved to the recording server. Alternatively, it is possible to execute the below flow in real time before a session has ended using whichever screenshots have been saved up until that point in time.

In a first step 728 a suitable processing server (executing upon computer 98 or other) executes server-side audiovisual manipulation software for the purpose of creating a video of the shared whiteboard during the session. A variety of manipulation software may be used, preferably, the server-side open source software FFmpeg, is used. In step 732 a loop begins which will import into this AV software each saved screenshot of a session in chronological order in order to create a video of the shared whiteboard.

In step 736 the first screenshot saved for a particular session is imported into the AV software and the AV software begins creating video frames based upon that current screenshot. In the case of a new session which is being recorded the first screenshot will likely be a blank whiteboard in which no drawing actions have yet occurred, such as the blank whiteboard of FIG. 9 (not including image 352). In other situations where the session being recorded is a continuation of a previous such session in which drawings had occurred on the whiteboard, the first screenshot may very well be the last image of the whiteboard from the previous session. For example, if the previous session ended with whiteboard 590 and the users begin with that whiteboard to record a new session, then whiteboard 590 will be the first screenshot of that new session. The first screenshot begins at elapsed time 0:00 and the AV software begins creating video frames of that screenshot.

The AV software in step 740 will continue creating video frames based upon that current screenshot at the preselected frame rate until the elapsed time equals the timestamp of the next screenshot. For example, if the second screenshot has a timestamp of 5 seconds, then the AV software will create video frames based upon the first screenshot for total of 5 seconds. If the frame rate is 30 frames per second, then the AV software will create 150 frames of the video all showing the first screenshot. Once the elapsed time equals the timestamp of the next screenshot, then control returns to step 736 in which that next screenshot is imported into the AV software and the software then begins creating frames of that screenshot and adding those frames to the video being created until the elapsed time equals the timestamp of the next screenshot to be imported. The loop ends in step 744 when no screenshots remain.

In step 748 the AV software exports the created video stream along with metadata (such as room identifier, etc.) in a suitable format such as MP4, OGG, SWF, etc. This video stream is preferably saved into persistent storage onto the same computer where the other audio and video streams have earlier been saved, such as computer 98.

Combine all Streams

Figure 20A:
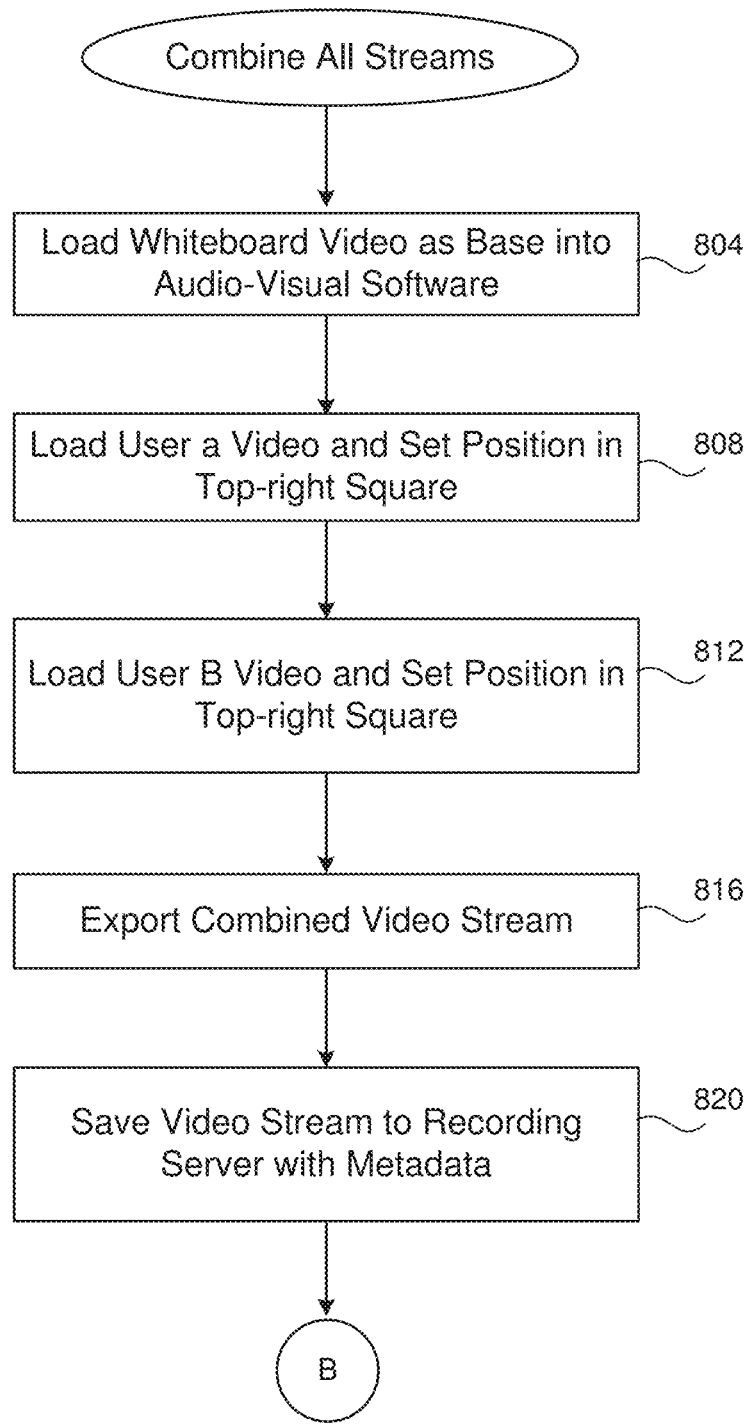
FIG. 20A-20B are a flow diagram describing one embodiment by which an all video, audio and whiteboard streams from a particular session are combined in order to create a resulting video stream.
Figure 20B:
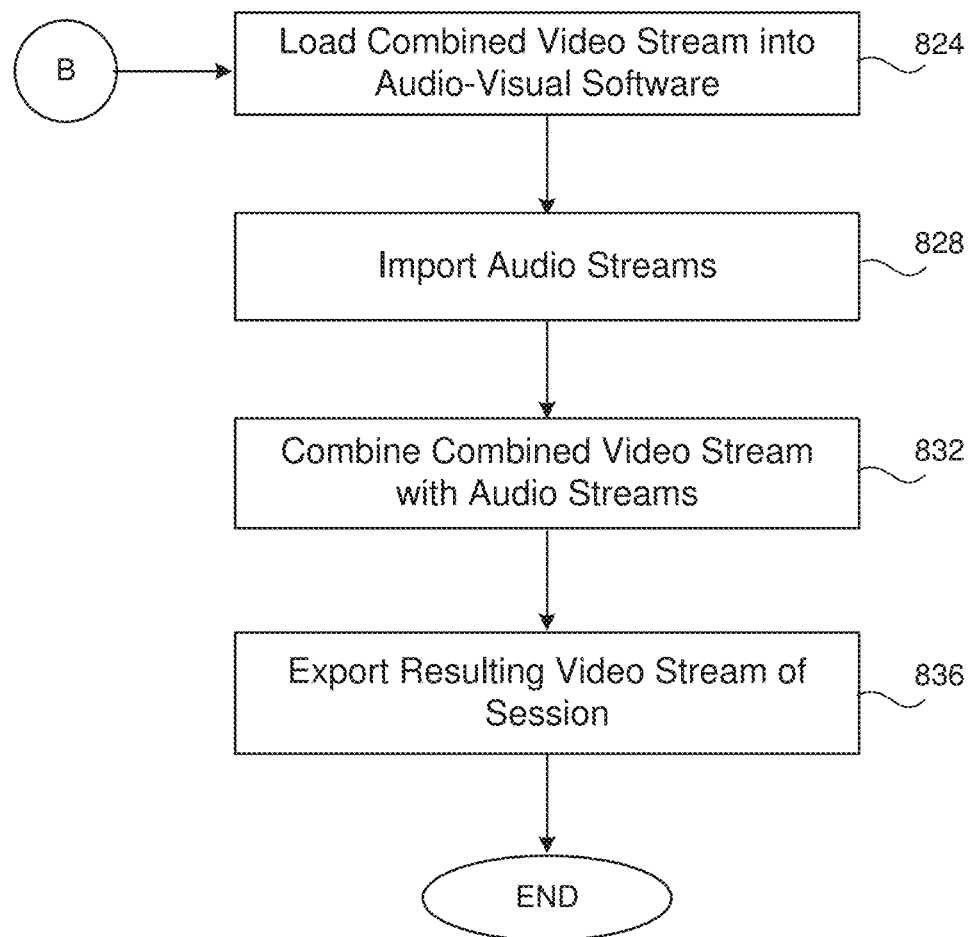

FIGS. 20A and 20B are a flow diagram describing one embodiment by which an all video, audio and whiteboard streams from a particular session are combined in order to create a resulting video stream. Since each stream (whether the video of a user, audio of a user, or the created whiteboard video) begins at the same elapsed time the streams will be aligned and the video, audio and whiteboard streams will be synchronized. One exception is a second or subsequent user in a session who joins after an earlier user had begun the recording. The video and audio streams for users include with a timestamp of when they join the session. For example, while the first user to record the session begins at the time of 15:30, if a second user joins 20 seconds into the session, his or her video and audio will begin with a timestamp of 15:50. The audiovisual software is able to combine and align video streams or audio streams beginning at different times using these offset timestamps such that the combined or resulting video stream is synchronized according to real life during the session.

In a first step 804 the recently created whiteboard video is loaded as a base into the audiovisual software executing, for example, upon computer 98 or upon another suitable computer. This simple example will assume that there are two users in the session although any number of users having corresponding video and audio streams may be used. In a next step 808 the recorded video stream from user A is loaded into the audio visual software and settings of this audiovisual software are used to set the position and size of this video in the top right square of the video that is being created. For example, as shown in FIG. 11, the position and size may be set to correspond to region 372 or to region 352. Similarly, in step 812 the recorded video stream from user B is loaded into the audiovisual software and its position and size are also set in the top right square, e.g., region 352 if the video from user A is set to region 372.

Next, in step 816 the audiovisual software combines these three videos and exports a combined video stream in any of the formats mentioned above. In step 820 this combined video stream may be saved to the recording server computer 98 along with metadata such as the room identifier, date of the session, user identifiers, etc.).

Now that the video streams have been combined into a combined video stream, the next steps will align the audio streams. Accordingly, in step 824 the recently saved combined video stream from step 820 is loaded into the audiovisual software. Of course, the flow of FIG. 20B may occur immediately after the flow of FIG. 20A in which case steps and 816, 820 and 824 are optional, and step 812 is followed immediately by step 828.

In step 828 both audio streams from both users are imported into the audiovisual software which already has created or imported the combined video stream. In step 832 the audiovisual software combines the combined video stream with the imported audio streams to create the resulting video stream of the session in question. In step 836 the audiovisual software exports this resulting video into a suitable format along with metadata such as room identifier, data session, user identifiers, etc. Thus, the resulting video shows drawing actions, video and audio of all users, as if the video had been made using the screen of one of the user computers. For example, the views of FIGS. 9, 11 and 15A-15B are used to create a single resulting video showing the progression of drawing changes on the shared whiteboard and synchronized with the user's audio and video streams.

Video Clips of Whiteboard Session

A user may also create a video clip of a portion of a session using the shared whiteboard. When the session begins the shared whiteboard and the session are recorded as described above (or by using any other suitable technology) automatically without any user intervention. In fact, the user may not be aware that the session is being recorded. When the user desires to create a video clip of a certain portion of the session he or she presses a "start video" button which simply sends a timestamp to the recording server. When the user desires to end the video clip he presses the "end video" button which, again, simply sends a second timestamp to the recording server. The recording server then uses the first and second timestamps to clip a portion of the recorded session and may save this clip for future access by the user or may send the clip to the user via text message, e-mail message, etc.

Figure 21B:
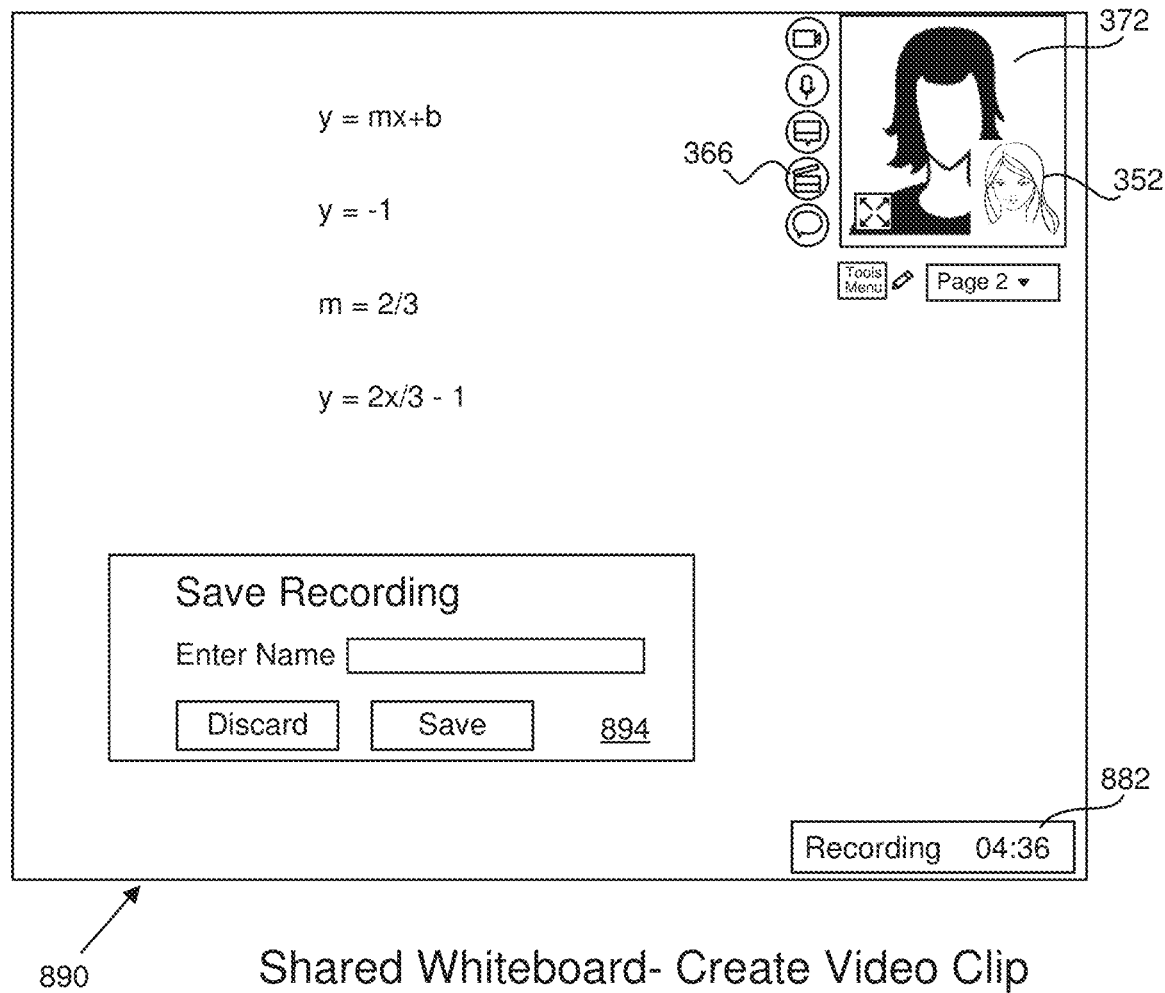

FIGS. 21A and 21B show how user may create a video clip during a session. As shown in view 880, included is a button 366 for starting the recording of a video clip and also for ending the recording of a video clip. In this example, two users have entered a session which has began previously, and one of the users has selected the "Page" drop-down menu in order to select a new page 2 which is currently blank. In this example, recording of the session (including the shared whiteboard and both audio and video streams from users) began when the first user enter the session. This recording began automatically without either user having to take any action, in fact, each user need not be aware that the entire session is being recorded. At any point in time during the session one of the users may click button 366 in order to record a video clip of a portion of the session. But, since the entire session is already being recorded, all that happens upon that button click is that a begin timestamp is sent to the recording server within computer 98 to be associated with the resulting video of the session when it is created. As shown at the bottom of the shared whiteboard, a window 882 indicates that the recording of this video clip began four seconds ago.

FIG. 20B shows a later point in time after one of the users has added equations to represent the slope of a line on a graph. At this time, the user clicks button 366 again in order to and recording of the video clip. But, since the entire session is already being recorded, all that happens upon that button click is that an end timestamp is sent to the recording server within computer 98 be associated with the resulting video of the session when it is created. As shown, the user desires that the clip end at the time shown at 882. After pressing button 266, a dialog box 894 appears requesting the user to enter a name for the video clip. Upon pressing the "Save" button, this name is also sent to the recording server to also be associated with the resulting video, along with the begin and end timestamps. At this time, both users may continue to use the shared whiteboard and may create further video clips of the session again by pressing button 366 to begin and end each video clip. Advantageously, little bandwidth is required to create any number or length of video clips desired by a user during a session. The selection of button 366 does not actually start or stop any recording of actions or screenshots; it simply sends a timestamp to the recording server.

During step 516 these begin and end timestamps may be used to clip the designated portion of the video, audio and whiteboard streams in order to create a video clip having the name given by the user. These video clips are stored on recording server computer 98 and may be delivered to the user via e-mail, made available upon a Web site, etc. for later viewing. Or, the video clip may be created after step 520 by using the timestamps to clip the resulting video of the session. In one embodiment, the resulting video of the entire session still exists and a video clip is created that is simply a copy of the designated portion of the session. Alternatively, the resulting video is clipped using the timestamps such that only the video clip is stored for future use.

Computer and Mobile Device Embodiments

Figure 26:
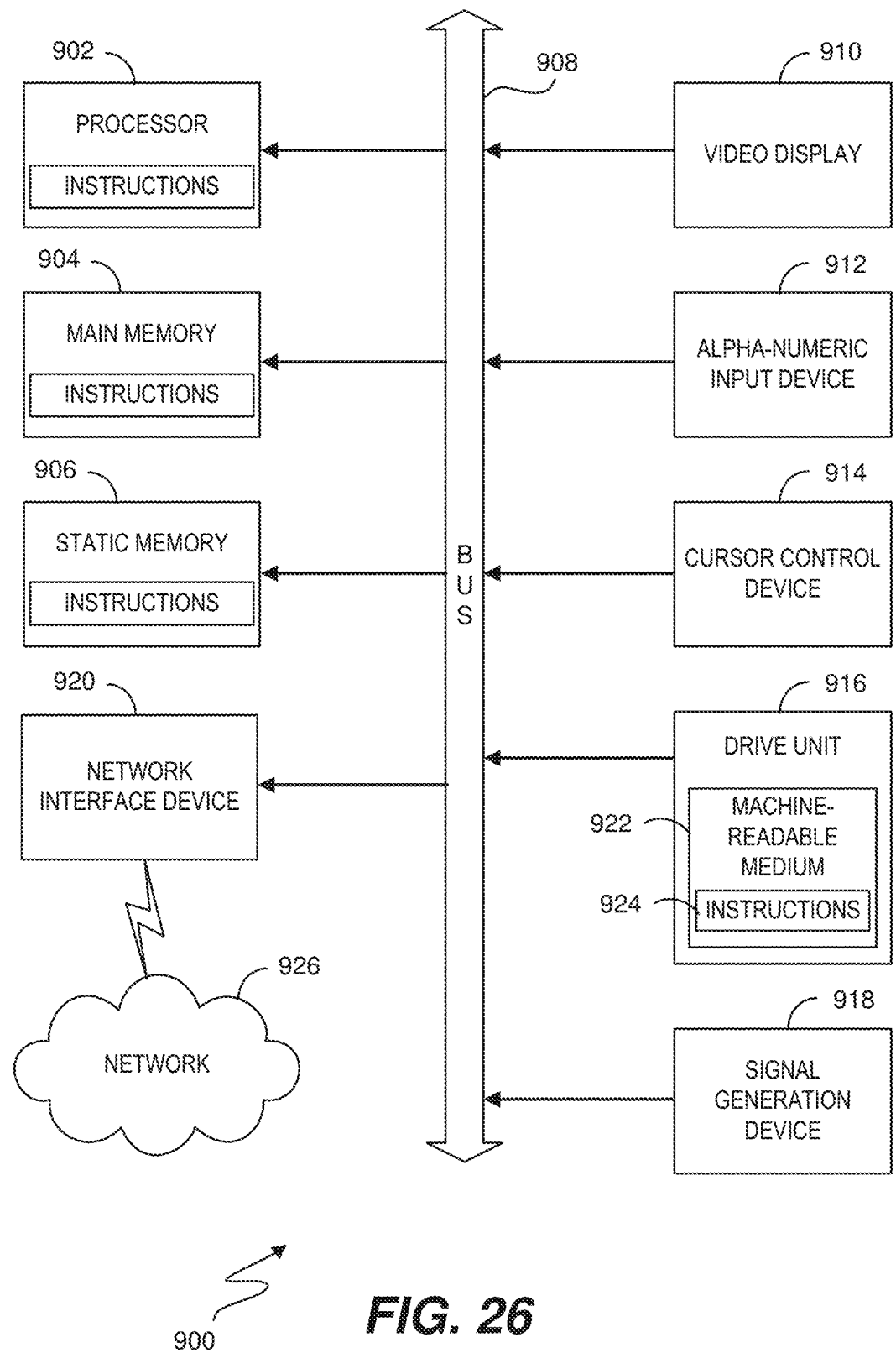
FIG. 26 is a block diagram of a computer system suitable for implementing embodiments of the present invention.

FIG. 26 is a block diagram of a user computer 900 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer 900 includes a processor 902 (e.g., a central processing unit (CPU), a graphics processing unit (GPU) or both), a main memory 904 and a static memory 906, which communicate with each other via a bus 908. The computer 900 may further include a video display unit 910 (e.g., a liquid crystal display (LCD) or a cathode ray tube (CRT)). The computer 900 also includes an alphanumeric input device 912 (e.g., a keyboard), a user interface (UI) navigation device 914 (e.g., a mouse), a disk drive unit 916, a signal generation device 918 (e.g., a speaker) and a network interface device 920.

The disk drive unit 916 includes a machine-readable medium 922 on which is stored one or more sets of instructions and data structures (e.g., software 924) embodying or utilized by any one or more of the methodologies or functions described herein. The software 924 may also reside, completely or at least partially, within the main memory 904 and/or within the processor 902 during execution thereof by the computer 900, the main memory 904 and the processor 902 also constituting machine-readable media. The software 924 may further be transmitted or received over a network 926 via the network interface device 920 utilizing any one of a number of well-known transfer protocols (e. g., HTTP).

Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

While the machine-readable medium 922 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Although an embodiment of the present invention has been described with reference to specific exemplary embodiments, it may be evident that various modifications and changes may be made to these embodiments without departing from the broader spirit and scope of the invention. Accordingly, the specification and annotations/drawings are to be regarded in an illustrative rather than a restrictive sense.

According to various embodiments, computer 900 may include a variety of components, modules and/or systems for providing various types of functionality. For example, in at least one embodiment, computer 900 may include a Web browser application which is operable to process, execute, and/or support the use of scripts (e.g., JavaScript, AJAX, etc.), Plug-ins, executable code, virtual machines, HTML5 vector-based web animation (e.g., Adobe Flash), etc. The Web browser application may be configured to instantiate components and/or objects at the computer in response to processing scripts, instructions, and/or other information received from a remote server such as a Web server.

Figure 27:
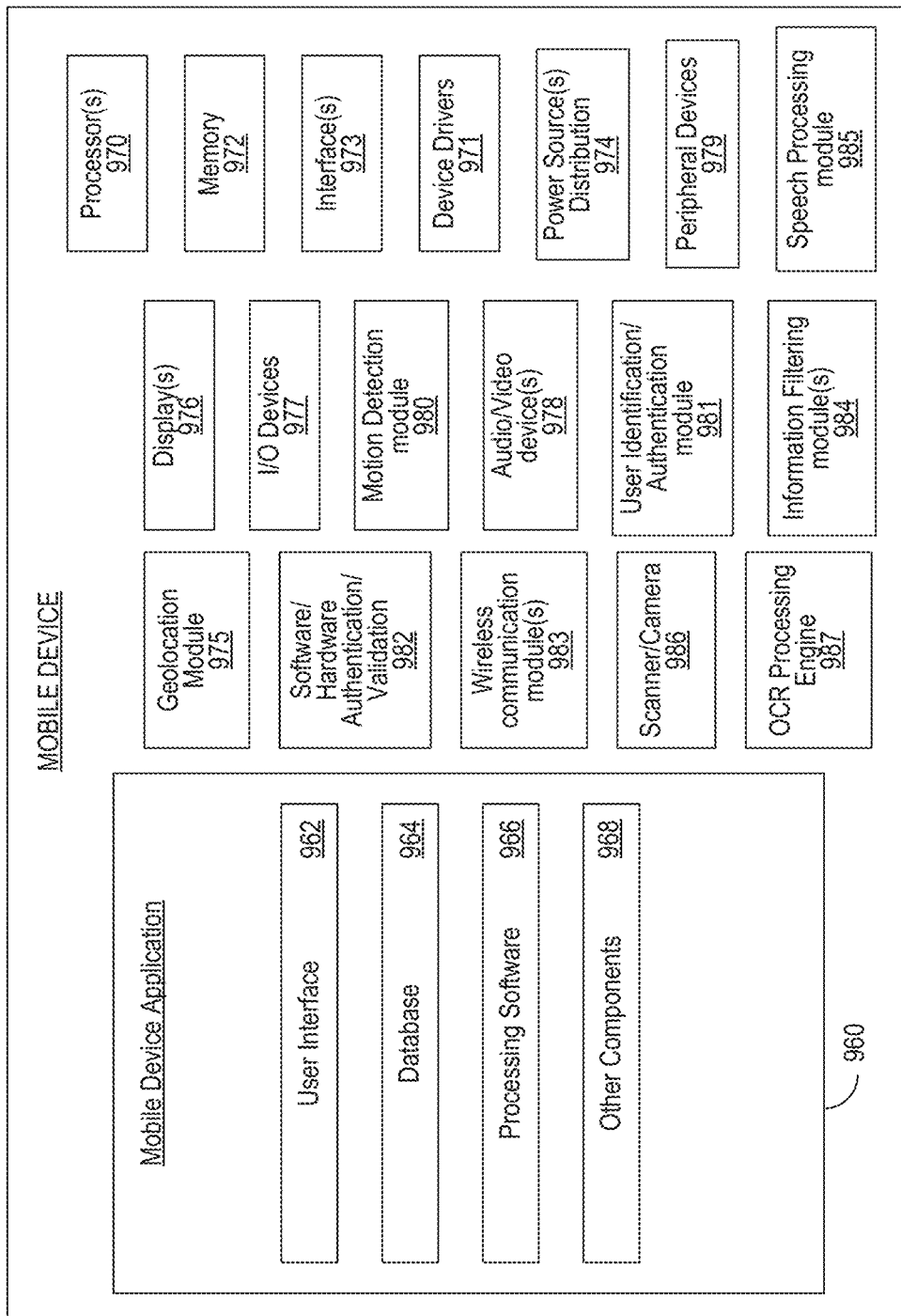
FIG. 27 is a block diagram of a mobile device suitable for implementing embodiments of the present invention.

FIG. 27 is a simplified block diagram of an example mobile device 950. Mobile device 950 may include mobile device application 960 which includes a user interface 962, a database 964, processing software 966, and other components 968 for enabling the mobile device to perform various types of functions such as those described herein.

Various functionalities of the mobile device may be performed by one or more of the following components: processor(s) 970; device drivers 971; memory 972; interface(s) 973; power source(s)/distribution 974; geolocation module 975; display(s) 976; I/O devices 977; audio/video devices(s) 978; peripheral devices 979; motion detection module 980; user identification/authentication module 981; software/hardware authentication/validation 982; wireless communication module(s) 983; information filtering module(s) 984; speech processing module 985; scanner/camera 986; and OCR processing engine 987.

Memory 972 may include volatile memory (e.g., RAM) as well as non-volatile memory (e.g., persistent storage, disk memory, FLASH memory, EPROMs, unalterable memory etc.) implemented on a machine-readable medium. Interface(s) 306 may include wired interfaces or wireless interfaces. The wireless communication interfaces may be configured or designed to communicate with computers, remote servers, other wireless devices. Such wireless communication may be implemented using one or more wireless interfaces/protocols such as, for example, 802.11 (WiFi), 802.15 (including Bluetooth™) 802.16 (WiMax), 802.22, Cellular standards such as CDMA, CDMA2000, WCDMA, Radio Frequency (e.g., RFID), Infrared, Near Field Magnetics, etc. Geolocation module 975 acquires geolocation information from remote sources and uses the acquired geolocation information to determine information relating to a relative or absolute position of the mobile device.

Motion detection component 980 detects motion or movement of the mobile device and detects motion, movement, gestures or other input data from user. The motion detection component 980 may include one or more motion detection sensors such as MEMS (Micro Electro Mechanical System) accelerometers that can detect the acceleration or other movements of the mobile device as it is moved by a user. I/O Device(s) 977 include keys, buttons, scroll wheels, cursors, touchscreen sensors, audio command interfaces, a magnetic strip reader, an optical scanner, etc. Audio/video device(s) 978 include cameras, speakers, microphones, wireless transmitter/receiver devices for enabling wireless audio and/or visual communication between the mobile device and remote devices (e.g., radios, telephones, computer systems, etc.). Peripheral devices 979 include memory card readers, fingerprint readers, image projection devices, etc. Wireless communication module 983 may be configured to communicate with external devices using one or more wireless interfaces/protocols such as, for example, 802.11 (WiFi), 802.15 (including Bluetooth™) 802.16 (WiMax), 802.22, Cellular standards such as CDMA, CDMA2000, WCDMA, Radio Frequency (e.g., RFID), Infrared, Near Field Magnetics, etc. Scanner/Camera 986 may be use in scanning identifiers or other content from other devices or objects such as mobile device displays, computer displays, static displays (e.g., printed on tangible mediums), etc. OCR Processing Engine 987 is operable to perform image processing and optical character recognition of images such as those captured by a mobile device camera, for example. Speech processing module 985 performs speech recognition, speech-to-text conversion, etc.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of creating a video of an electronic whiteboard, said method comprising:
    executing code to emulate a computer browser on a computer;
    loading a representation of an electronic whiteboard into said emulated browser on said computer;
    loading a plurality of data sets from a database into said emulated browser in sequence and rendering a corresponding drawing action from each of said data sets on said electronic whiteboard, each of said data sets not being an image, a screenshot or a video of a drawing action;
    after each of said data sets is loaded, said computer taking a screenshot of said electronic whiteboard and storing said screenshot, wherein each of said data sets includes a timestamp of when said corresponding drawing action was stored in said database, each of said stored screenshots also including the timestamp corresponding to the data set used to create said screenshot; and
    importing said stored screenshots into audiovisual software in sequence and exporting a whiteboard video based upon said stored screenshots.

2. A method as recited in claim 1 further comprising:
    storing said data sets into said database as received from a plurality of computing devices, each of said computing devices displaying the same shared whiteboard.

3. A method as recited in claim 1 wherein said representation of said electronic whiteboard includes a video box region arranged to include a video or image of at least one user.

4. A method as recited in claim 1 further comprising:
    importing an audio file of a user recorded on a computing device that produced said data sets into said audiovisual software; and
    combining said audio file with said whiteboard video to create a resulting video of a whiteboard session such that audio of said audio file is synchronized with said drawing actions of said whiteboard video and exporting said resulting video.

5. A method as recited in claim 4 further comprising:
    importing a video file of a user recorded on said computing device into said audiovisual software; and
    combining said video file with said resulting video such that images of said video file are synchronized with said drawing actions of said whiteboard video and exporting a new resulting video.

6. A method as recited in claim 1 further comprising:
    loading a begin timestamp from said database that originated from a computing device that produced said data sets into said audiovisual software;
    loading an end timestamp from said database that originated from said computing device into said audiovisual software; and
    clipping said whiteboard video using said begin and end timestamps to create a whiteboard video clip.

7. A method of creating a video of an electronic whiteboard, said method comprising:
    displaying an electronic whiteboard in a first browser of a first computing device;
    receiving a plurality of drawing actions from a user of said first computing device and rendering said drawing actions in sequence on said electronic whiteboard;
    after an end of each of said drawing actions, detecting said end of said each drawing action, and when said end is detected, said first browser taking a screenshot of said electronic whiteboard, wherein said end of said each drawing action acts as a signal to instruct said first browser to take said screenshot;
    sending said screenshots taken with said first browser from said first computing device to a recording computer over a network connection, wherein said screenshots are discrete images and are not part of a video stream, and storing said screenshots taken with said first browser into a screenshot database; and
    importing said stored screenshots from said screenshot database into audiovisual software in sequence, creating a whiteboard video from said stored screenshots on said recording computer and exporting said whiteboard video.

8. A method as recited in claim 7 further comprising:
    storing along with each of said stored screenshots a timestamp corresponding to the end of each of said drawing actions, wherein said creating a whiteboard video is based upon said timestamps and uses a preselected frame rate of said whiteboard video.

9. A method as recited in claim 7 further comprising:
    displaying said electronic whiteboard in a second browser of a second computing device, said electronic whiteboard being shared between said first and second computing devices;
    receiving a plurality of drawing actions from a user of said second computing device and rendering said drawing actions received from said user of said second computing device in sequence on said electronic whiteboard on said second computing device; and
    after an end of each of said drawing actions, said second browser of said second computing device taking a screenshot of said electronic whiteboard and storing said screenshot taken with said second browser into said screenshot database.

10. A method as recited in claim 7 wherein said electronic whiteboard includes a video box region that includes a video or image of at least one user.

11. A method as recited in claim 7 further comprising:
    importing an audio file of a user recorded on said first computing device during said drawing actions into said audiovisual software; and
    combining said audio file with said whiteboard video to create a resulting video of a session on said electronic whiteboard such that audio of said audio file is synchronized with said drawing actions of said whiteboard video and exporting said resulting video.

12. A method as recited in claim 7 further comprising:
    importing an audio file and a video file of a user recorded on said first computing device during said drawing actions into said audiovisual software; and
    combining said audio file and said video file with said whiteboard video to create a resulting video of a session on said electronic whiteboard such that audio of said audio file and images of said video file are synchronized with said drawing actions of said whiteboard video and exporting a resulting video.

13. A method as recited in claim 7 further comprising:
    receiving a first selection on said electronic whiteboard from said user indicating a begin timestamp and sending said begin timestamp to said screenshot database;
    receiving a second selection on said electronic whiteboard from said user indicating an end timestamp and sending said end timestamp to said screenshot database; and
    importing said begin and end timestamps into said audiovisual software and clipping said whiteboard video using said begin and end timestamps to create a whiteboard video clip.

14. A method as recited in claim 7 wherein each of said screenshots is only taken after said end of said each drawing action.

15. A method of creating a video of an electronic whiteboard, said method comprising:
- displaying an electronic whiteboard in a first browser of a first computing device;
- receiving a plurality of drawing actions from a user of said first computing device and rendering said drawing actions in sequence on said electronic whiteboard;
- said first browser periodically taking a screenshot of said electronic whiteboard at a first defined interval, wherein said first defined interval is a fixed amount of time;
- sending said screenshots taken with said first browser from said first computing device to a recording computer over a network connection, wherein said screenshots are discrete images and are not part of a video stream, and storing said screenshots taken with said first browser into a screenshot database;
- storing along with each of said stored screenshots a timestamp corresponding to the time when said screenshot was taken; and
- importing said stored screenshots from said screenshot database into audiovisual software in sequence, creating a whiteboard video from said stored screenshots on said recording computer and exporting said whiteboard video, wherein said creating a whiteboard video is based upon said timestamps and a preselected frame rate of said whiteboard video.

16. A method as recited in claim 15 further comprising:
- displaying said electronic whiteboard in a second browser of a second computing device, said electronic whiteboard being shared between said first and second computing devices;
- receiving a plurality of drawing actions from a user of said second computing device and rendering said drawing actions received from said user of said second computing device in sequence on said electronic whiteboard on said second computing device; and
- said second browser of said second computing device periodically taking a screenshot of said electronic whiteboard at a second defined interval and storing said screenshot taken with said second browser into said screenshot database.

17. A method as recited in claim 16 wherein said first and second defined intervals are the same.

18. A method as recited in claim 15 further comprising:
- importing an audio file of a user recorded on said first computing device during said drawing actions into said audiovisual software; and
- combining said audio file with said whiteboard video to create a resulting video of a session on said electronic whiteboard such that audio of said audio file is synchronized with said drawing actions of said whiteboard video and exporting said resulting video.

19. A method as recited in claim 15 further comprising:
- importing an audio file and a video file of a user recorded on said first computing device during said drawing actions into said audiovisual software; and
- combining said audio file and said video file with said whiteboard video to create a resulting video of a session on said electronic whiteboard such that audio of said audio file and images of said video file are synchronized with said drawing actions of said whiteboard video and exporting a resulting video.

20. A method as recited in claim 15 further comprising:
- receiving a first selection on said electronic whiteboard from said user indicating a begin timestamp and sending said begin timestamp to said screenshot database;
- receiving a second selection on said electronic whiteboard from said user indicating an end timestamp and sending said end timestamp to said screenshot database; and
- importing said begin and end timestamps into said audiovisual software and clipping said whiteboard video using said begin and end timestamps to create a whiteboard video clip.

\* \* \* \* \*